(12) United States Patent
Malhotra et al.

(10) Patent No.: US 12,373,226 B2
(45) Date of Patent: *Jul. 29, 2025

(54) REAL-TIME EVENT ANALYSIS UTILIZING RELEVANCE AND SEQUENCING

(71) Applicant: ZineOne, Inc., Milpitas, CA (US)

(72) Inventors: Manish Malhotra, Milpitas, CA (US); Siddartha Sikdar, Milpitas, CA (US); Aurobindo Sarkar, Milpitas, CA (US)

(73) Assignee: Session AI, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,284

(22) Filed: Sep. 7, 2021

(65) Prior Publication Data

US 2022/0067559 A1 Mar. 3, 2022

Related U.S. Application Data

(63) Continuation of application No. 16/387,517, filed on Apr. 17, 2019, now Pat. No. 11,113,615.

(Continued)

(51) Int. Cl.
*G06F 9/451* (2018.01)
*G06F 11/30* (2006.01)
*G06F 11/34* (2006.01)
*G06N 5/043* (2023.01)
*G06N 5/047* (2023.01)

(Continued)

(52) U.S. Cl.
CPC .......... *G06F 9/451* (2018.02); *G06F 11/3006* (2013.01); *G06F 11/3058* (2013.01); *G06F 11/3438* (2013.01); *G06N 5/043* (2013.01); *G06N 5/047* (2013.01); *G06N 5/048* (2013.01); *G06N 20/00* (2019.01); *H04L 43/08* (2013.01); *H04L 43/16* (2013.01); *H04L 67/04* (2013.01); *H04L 67/125* (2013.01); *H04L 67/14* (2013.01);

(Continued)

(58) Field of Classification Search
CPC ......... H04L 67/14; H04L 51/18; H04L 51/32; H04L 63/0407; G06Q 20/223; G06Q 20/3223; G06Q 20/283; G06Q 30/06; G06Q 50/01; G06Q 10/10; G06F 9/451
See application file for complete search history.

(56) References Cited

U.S. PATENT DOCUMENTS 8,185,514 B1 5/2012 Skrenta
8,473,347 B1 6/2013 Koningstein
(Continued)

FOREIGN PATENT DOCUMENTS

CA 2933649 6/2015

OTHER PUBLICATIONS

Non-Final Office Action, U.S. Appl. No. 16/387,515, mailed Apr. 10, 2025, 16 pages.

*Primary Examiner* — Dhairya A Patel
(74) *Attorney, Agent, or Firm* — Mahamedi IP Law LLP

(57) ABSTRACT

A computer system operates to detect a series of activities performed by a user, where the activities include interactions as between the user and one or more user interface components. The computer system recognizes the of activities as a sequence of events, where each event of the sequence corresponds to one more activities of the series. In response to the computer system detecting a current user activity, the computer system determines at least one of a user intent or interest based on an analysis of a relevant portion of the sequence of events.

14 Claims, 10 Drawing Sheets

Related U.S. Application Data

(60) Provisional application No. 62/729,995, filed on Sep. 11, 2018.

(51) Int. Cl.

| | | |
|---|---|---|
| *G06N 5/048* | (2023.01) | |
| *G06N 20/00* | (2019.01) | |
| *H04L 43/08* | (2022.01) | |
| *H04L 43/16* | (2022.01) | |
| *H04L 67/04* | (2022.01) | |
| *H04L 67/125* | (2022.01) | |
| *H04L 67/14* | (2022.01) | |
| *H04L 67/30* | (2022.01) | |
| *H04L 67/50* | (2022.01) | |
| *G06N 3/08* | (2023.01) | |
| *H04L 67/10* | (2022.01) | |

(52) U.S. Cl.
CPC .......... *H04L 67/30* (2013.01); *H04L 67/535* (2022.05); *G06N 3/08* (2013.01); *H04L 67/10* (2013.01)

(56) References Cited

U.S. PATENT DOCUMENTS

| | | | |
|---|---|---|---|
| 8,707,431 B2* | 4/2014 | Stephens | H04L 63/1408 726/22 |
| 10,237,215 B2 | 3/2019 | Pattan | |
| 10,567,568 B2* | 2/2020 | Dotan-Cohen | H04W 4/029 |
| 10,719,854 B2* | 7/2020 | Chhabra | G06Q 50/01 |
| 10,846,604 B2* | 11/2020 | Malhotra | H04L 43/16 |
| 11,062,360 B1 | 7/2021 | Donamukkala | |
| 11,132,733 B2* | 9/2021 | Srinivasan | G06F 16/9535 |
| 11,158,204 B2* | 10/2021 | Harlow | G06N 7/00 |
| 11,580,088 B2 | 2/2023 | Novak | |
| 12,243,006 B2* | 3/2025 | Rule | G06Q 10/0833 |
| 2004/0034612 A1 | 2/2004 | Mathewson | |
| 2004/0181340 A1 | 9/2004 | Smith | |
| 2007/0083854 A1* | 4/2007 | Mayer-Ullmann | G06F 8/73 717/124 |
| 2008/0201733 A1 | 8/2008 | Ertugrul | |
| 2008/0275786 A1 | 11/2008 | Gluck | |
| 2009/0299840 A1 | 12/2009 | Smith | |
| 2010/0082516 A1 | 4/2010 | Basu | |
| 2010/0138368 A1 | 6/2010 | Stunder | |
| 2010/0228634 A1 | 9/2010 | Ghosh | |
| 2010/0275653 A1 | 11/2010 | Perry | |
| 2011/0066650 A1* | 3/2011 | Fuxman | G06F 16/3349 707/E17.108 |
| 2011/0213655 A1* | 9/2011 | Henkin | G06Q 30/00 707/E17.061 |
| 2012/0047022 A1 | 2/2012 | Shamin | |
| 2012/0166268 A1* | 6/2012 | Griffiths | G06Q 30/0222 705/14.23 |
| 2012/0176509 A1* | 7/2012 | Aravamudan | H04N 21/25 348/E5.031 |
| 2012/0284212 A1 | 11/2012 | Lin | |
| 2012/0290521 A1 | 11/2012 | Frank | |
| 2013/0066705 A1 | 3/2013 | Umeda | |
| 2013/0185164 A1 | 7/2013 | Pottjegort | |
| 2013/0238686 A1* | 9/2013 | O'Donoghue | G06F 9/4451 709/203 |
| 2013/0325633 A1 | 12/2013 | McAfee | |
| 2014/0130076 A1 | 5/2014 | Moore | |
| 2014/0155094 A1 | 6/2014 | Zises | |
| 2014/0180758 A1* | 6/2014 | Agarwal | G06Q 30/06 705/7.29 |
| 2014/0221084 A1* | 8/2014 | Morrison, III | H04L 67/60 463/29 |
| 2014/0237595 A1 | 8/2014 | Sridhara | |
| 2014/0349269 A1 | 11/2014 | Canoy | |
| 2015/0002350 A1 | 1/2015 | Li | |
| 2015/0199707 A1* | 7/2015 | Ono | G06Q 30/0641 705/14.39 |
| 2015/0212236 A1 | 7/2015 | Haas | |
| 2015/0286684 A1* | 10/2015 | Heinz | G06F 16/24568 707/769 |
| 2015/0310334 A1 | 10/2015 | Huang | |
| 2015/0332414 A1* | 11/2015 | Unser | G06F 16/285 705/30 |
| 2015/0350354 A1* | 12/2015 | Ji | H04L 67/02 715/205 |
| 2016/0005280 A1 | 1/2016 | Laska | |
| 2016/0029055 A1* | 1/2016 | Villegas Nunez | H04N 21/251 725/14 |
| 2016/0063597 A1 | 3/2016 | Goulart | |
| 2016/0071349 A1* | 3/2016 | Tambaku | G06Q 30/0633 705/12 |
| 2016/0171535 A1 | 6/2016 | Linden | |
| 2016/0189049 A1 | 6/2016 | Silvestri | |
| 2016/0210657 A1 | 7/2016 | Chittilappilly | |
| 2016/0239848 A1* | 8/2016 | Chang | G06Q 30/016 |
| 2016/0239897 A1 | 8/2016 | Ghose | |
| 2016/0242690 A1 | 8/2016 | Principe | |
| 2016/0277264 A1* | 9/2016 | Zarn | H04L 67/535 |
| 2016/0343093 A1 | 11/2016 | Riland | |
| 2017/0046510 A1 | 2/2017 | Chen | |
| 2017/0140041 A1* | 5/2017 | Dotan-Cohen | G06F 16/335 |
| 2017/0140285 A1 | 5/2017 | Dotan-Cohen | |
| 2017/0140437 A1 | 5/2017 | Bhat | |
| 2017/0161782 A1* | 6/2017 | Wigder | G06Q 30/0272 |
| 2017/0278062 A1 | 9/2017 | Mueller | |
| 2017/0300966 A1 | 10/2017 | Dereszynski et al. | |
| 2017/0316343 A1 | 11/2017 | Shamsi | |
| 2017/0372232 A1 | 12/2017 | Maughan | |
| 2018/0046957 A1* | 2/2018 | Yaari | G06Q 10/1095 |
| 2018/0081503 A1* | 3/2018 | Green | G06N 3/045 |
| 2018/0082191 A1 | 3/2018 | Pearmain | |
| 2018/0089737 A1* | 3/2018 | Ali | G06Q 30/0255 |
| 2018/0144059 A1 | 5/2018 | Saikia | |
| 2018/0150758 A1 | 5/2018 | Niininen | |
| 2018/0174070 A1* | 6/2018 | Hoffman | G06N 7/01 |
| 2018/0189793 A1 | 7/2018 | Campos | |
| 2018/0268337 A1 | 9/2018 | Miller | |
| 2018/0293864 A1 | 10/2018 | Wedig | |
| 2018/0300609 A1 | 10/2018 | Krishnamurthy | |
| 2018/0314533 A1 | 11/2018 | Azhen | |
| 2018/0357670 A1* | 12/2018 | DeLuca | G06Q 30/0255 |
| 2019/0027141 A1 | 1/2019 | Strong | |
| 2019/0037036 A1* | 1/2019 | Sunkara | G06Q 30/0204 |
| 2019/0057071 A1* | 2/2019 | Fleming | H04L 65/75 |
| 2019/0066163 A1 | 2/2019 | Rubinstein | |
| 2019/0087868 A1* | 3/2019 | Setty | G10L 15/22 |
| 2019/0130777 A1 | 5/2019 | Dey | |
| 2019/0205839 A1* | 7/2019 | Dotan-Cohen | H04L 67/535 |
| 2019/0213999 A1 | 7/2019 | Grupen | |
| 2019/0258818 A1 | 8/2019 | Yu | |
| 2019/0266325 A1* | 8/2019 | Scherman | G06F 16/3347 |
| 2019/0373101 A1* | 12/2019 | Dotan-Cohen | G06Q 10/06314 |
| 2019/0388787 A1* | 12/2019 | Padmanabhan | A63F 13/47 |
| 2020/0081815 A1* | 3/2020 | Malhotra | G06N 5/047 |
| 2020/0082288 A1* | 3/2020 | Malhotra | G06F 11/3058 |
| 2020/0082294 A1 | 3/2020 | Malhotra | |
| 2020/0092322 A1* | 3/2020 | Boss | H04L 63/1466 |
| 2020/0097981 A1 | 3/2020 | Teo | |
| 2020/0279339 A1* | 9/2020 | Akutagawa | G06F 16/90324 |
| 2020/0314623 A1 | 10/2020 | Pellegrini | |
| 2020/0364588 A1 | 11/2020 | Knox | |
| 2021/0117833 A1 | 4/2021 | Malhotra | |
| 2021/0215848 A1 | 7/2021 | Mukherjee | |
| 2021/0312529 A1 | 10/2021 | Malparty | |
| 2022/0086108 A1 | 3/2022 | Higgins | |
| 2022/0277210 A1 | 9/2022 | Malhotra | |
| 2022/0277211 A1 | 9/2022 | Malhotra | |

\* cited by examiner

```
┌─────────────────────────────────────────────────────────────────────┐
│ Record A Sequence Of Activities Which A User Is Detected As Performing │
│                                                                 222 │
└─────────────────────────────────────────────────────────────────────┘
                                   ▼
┌─────────────────────────────────────────────────────────────────────┐
│ Analyze The Sequence Of User Activities In Connection With A Current User │
│             Activity To Predict A User Intent                   224 │
└─────────────────────────────────────────────────────────────────────┘
                                   ▼
┌─────────────────────────────────────────────────────────────────────┐
│ Initiate An Event To Cause The User To Perform A Desired User Action │
│            Based On The Predicted User Intent                   226 │
└─────────────────────────────────────────────────────────────────────┘
```

FIG. 2B

```
┌─────────────────────────────────────────────────────────────────────┐
│ Define A Session Boundary To Include One Or More Activities That Are │
│  Detected As Being Performed Using A Designated Set Of Resources    │
│                                                                 232 │
└─────────────────────────────────────────────────────────────────────┘
                                   ▼
┌─────────────────────────────────────────────────────────────────────┐
│ For Each User Of A First Group Of Users, Record A Series Of Session │
│  Activities, Including A First Activity That Coincides With The Defined │
│  Session Boundary And One Or More Subsequent Activities         234 │
└─────────────────────────────────────────────────────────────────────┘
                                   ▼
┌─────────────────────────────────────────────────────────────────────┐
│ Determine One Or More Models To Predict A Likelihood That The User Will │
│             Perform A Desired Activity                          236 │
└─────────────────────────────────────────────────────────────────────┘
                                   ▼
┌─────────────────────────────────────────────────────────────────────┐
│ Monitor The Designated Set Of Resources For Session Activities Of Multiple │
│           Users That Are Not Of The First Group                 238 │
└─────────────────────────────────────────────────────────────────────┘
                                   ▼
┌─────────────────────────────────────────────────────────────────────┐
│ For Each Of The Multiple Users, Make A Determination, Using The One Or │
│  More Models, As To Whether The User Is Likely To Perform A Desired │
│  Activity Based On One Or More Session Activities Detected For That User │
│                                                                 240 │
└─────────────────────────────────────────────────────────────────────┘
```

FIG. 2C

REAL-TIME EVENT ANALYSIS UTILIZING RELEVANCE AND SEQUENCING

RELATED APPLICATIONS

This application is a continuation of U.S. patent application Ser. No. 16/387,517, filed on Apr. 17, 2019; which claims benefit of priority to Provisional U.S. Patent Application No. 62/729,995, filed on Sep. 11, 2018; the aforementioned applications being hereby incorporated by reference in their respective entireties for all purposes.

TECHNICAL FIELD

Examples described herein relate to a network computing system for real-time event analysis.

BACKGROUND

Machine learning techniques have had increasing relevance to growing technologies and markets. Typically, machine learning systems analyze and act on stored data, sometimes communicated in batch during off-hours.

BRIEF DESCRIPTION OF THE DRAWINGS

FIG. 2B illustrates an example method for predicting an intent of a user.

FIG. 2C illustrates an example method for predicting user intent with respect to a particular type of activity.

DETAILED DESCRIPTION

Figure 1A:
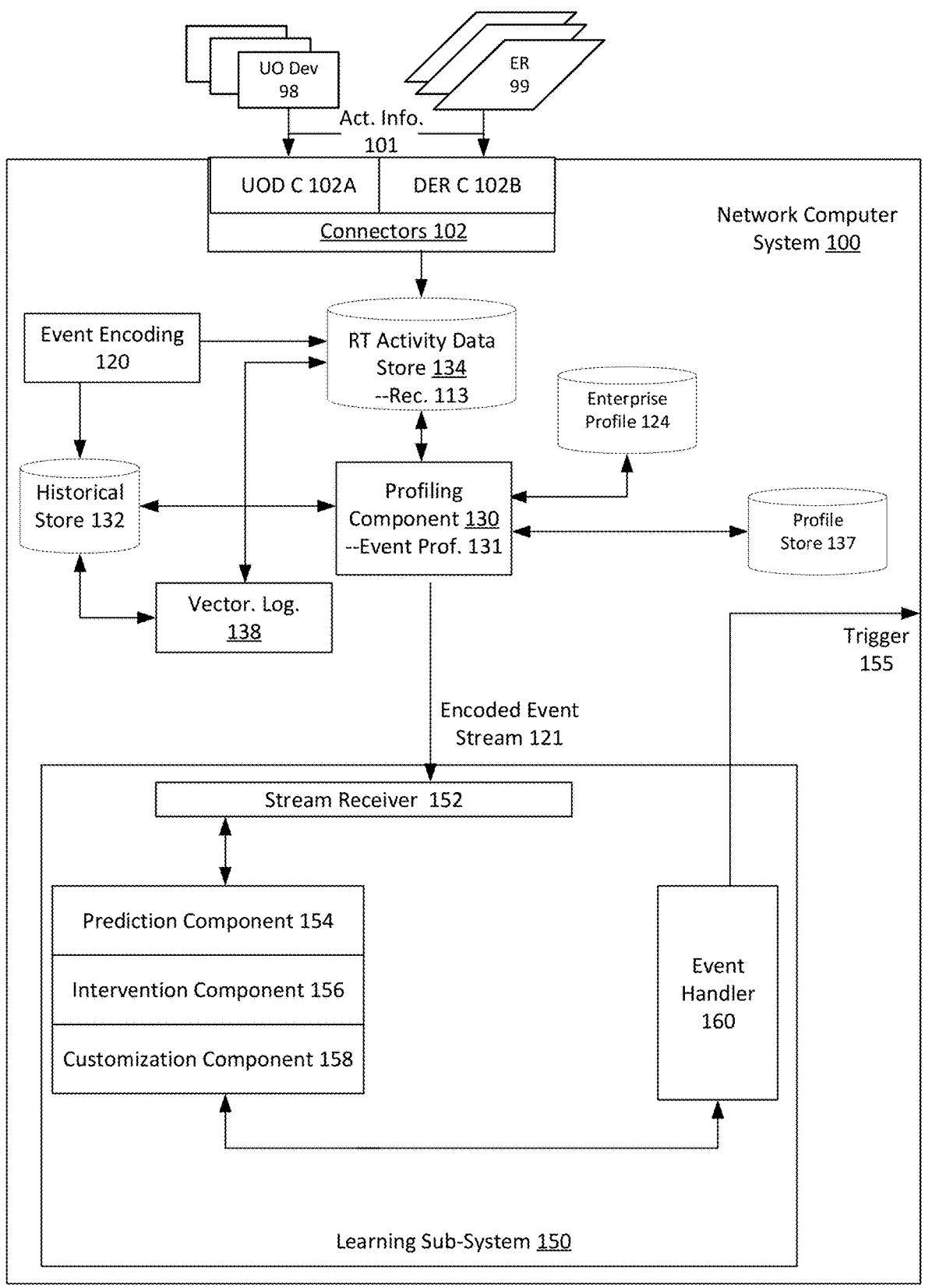
FIG. 1A illustrates a network computing system for real-time event analysis, according to one or more examples.

Examples provide for a network computing system, and method for implementing a network computing system, to analyze events accumulated over digital channels of an enterprise, for purpose of determining contextual and/or customized outputs that facilitate a desired objective of the enterprise.

In examples, a network computing system (or method thereof) is implemented to generate an encoded sequence of user events, and to analyze the encoded sequence for a user intent. The network computing system determines a trigger based at least in part on the user intent, and further performs an action based on the user-intent.

According to examples, a determination of user's "intent" includes a determination that a user is deemed to have a particular propensity or predisposition. Still further, in some examples, a determination of user's "intent" may include a determination of a likelihood that the user will have a particular response to a trigger (e.g., where the trigger is a particular communication, promotion or type thereof).

As compared to conventional approaches, examples recognize that the latency that is introduced between events of relevance and the outcome of the machine learning process can significantly hinder the accuracy and quality of the corresponding outcome. Examples as described reduce the latency as between when (i) events of relevance are detected, and (ii) a determination as to whether and how to influence the user actions is made. In the context of computer systems (e.g., servers) that implement network-based advertisements and promotions (e.g., such as on e-commerce sites), examples enable user-specific communications and other interventions to be provided to a target population of users in real-time, so that the objectives of the computer system are more efficiently met.

Still further, a network computer system can implement machine and deep learning techniques to process real-time data for purpose of end user engagement. In some examples, a network computer system can connect end user online behavior with their real-world activities, at least with respect to specific retailers, using event streams that reflect real-time detected events.

In some examples, a computer system records a sequence of activities that an end user is detected as performing. The computer system analyzes the sequence of user activities in connection with a current user activity to predict a user intent, and the computer system initiates an event to cause the user to perform a desired user action based on the predicted user intent.

In some examples, a computer system operates to detect a series of activities performed by a user, where the activities include interactions as between the user and one or more user interface components. The computer system recognizes the series of activities as a sequence of events, where each event of the sequence corresponds to one more activities of the series.

In response to the computer system detecting a current user activity, the computer system selects a relevant portion of the sequence of events. The computer system determines at least one of a user intent or interest, based on an analysis of the relevant portion of the sequence of events.

Still further, in some examples, a computer system operates to define a session boundary, where the session boundary includes one or more activities that are detected as being performed by a user during a corresponding session in which a designated set of resources are utilized. For each user of a first group of users, the computer system records a series of session activities, including a first activity that coincides with the defined session boundary and one or more subsequent activities. From the series of session activities of each user of the first group, the computer system determines one or more models to predict a likelihood that the user will perform a desired type of activity during a current or future session.

In some examples, the designated set of resources are subsequently monitored for session activities of multiple users that are not of the first group. For each of the multiple users, the computer system utilizes one or more predictive models to determine a likelihood of the user performing a desired type of activity based on one or more session activities detected for that user. Additionally, for each user of the multiple users for which the likelihood is below a threshold, the computer system may cause that user to be subject to an intervention that is selected as a trigger for causing the user to perform a desired user action.

Additionally, in some examples, computer system develops models and generates decision logic based on the developed models. The decision logic is distributed to end user devices, and the end user devices are able to implement the decision logic to detect events, determine event sequences, and correlate the determined event sequences to predicted outcomes.

Still further, in examples, a computer system operates to receive a data set that defines a plurality of events, and detects multiple activities that define a corresponding set of events from the plurality of events. The set of events are recorded in sequence to reflect an order in time in which each of the multiple activities that define the set of events took place. The computer system determines, using the sequence of events, a value representing an intent or interest of the uses, and the computer system implements a trigger based on the value representing the intent or interest of the user.

As used herein, a client device refers to devices corresponding to desktop computers, cellular devices or smartphones, wearable devices, laptop computers, tablet devices, television (IP Television), etc., that can provide network connectivity and processing resources for communicating with the system over a network.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates a network computing system for real-time event analysis, according to one or more examples. In particular, a network computing system 100 can implement processes to capture events in real-time, across one or multiple channels, and further to implement processes to analyze and act on the detected events. With respect to examples as described, the system 100 can be implemented on a server, on a combination of servers, and/or on a distributed set of computing devices which communicate over a network such as the Internet. Still further, some examples provide for the network computing system 100 to be distributed using one or more servers and/or mobile devices. In some variations, the network computing system 100 is implemented as part of, or in connection with a network system, where, for example, end users utilize applications running on mobile devices to engage in either online or real-world services (e.g., shopping in store or online).

The system 100 can provide user context data from real-time streams, historical datastores and enterprise systems for a range of event events and event types. In particular, the system 100 can implement learning and analysis for processing event patterns using a real-time response framework. Depending on the implementation, the real-time response framework can detect and respond to user events in seconds, less than a second, millisecond scale or even less.

In examples, the system 100 can implement a framework to generate a real-time response to a particular trigger or event, for purpose of causing or influencing a desired outcome from the end user. While the response to the particular trigger or event can be generated in real-time, the response can also be tailored or otherwise configured based on historical information about the end user who is the subject of the response. Accordingly, as described with various examples, the system 100 can utilize a combination of information that is obtained in real-time as well as from prior time intervals (e.g., historical information), in order to generate a real-time response to a particular trigger or event.

With further reference to FIG. 1, the system 100 includes multiple types of connectors 102, with each connector implementing processes for communicating with a particular type of device and/or enterprise resource (e.g., website, service or channel provided for users, etc.). As described in greater detail, the connectors 102 can represent an aggregation of processes that collectively aggregate activity information 101 in real-time from various user-operated devices and enterprise resources.

According to examples, the connectors 102 can include processes that communicate with applications running on devices, as well as processes that are provided with network or web resources of an enterprise. For example, the connectors 102 can include a mobile device application connector 102A that is implemented using a combination of a network or server-side process (or set of processes) and an application program interface (API) of a corresponding user-operated device 98 (e.g., mobile device). As an addition or alternative, the connectors 102 can include a website connector 102B that is implemented using a combination of a network or server-side process(es) and one or more programs that are implemented with the website (or other enterprise resource 98) through a software developer kit (SDK) of the website. As an addition or variation to connectors which collect information from user-operated devices, the system 100 can implement connectors 102 to monitor other types of enterprise resources 99 for activities performed by users. Such connectors 102 can employ processes that, for example, execute in a computing environment of an enterprise resource 99, in connection with a service that is provided to users (e.g., chatbot).

With reference to an example of FIG. 1A, the system 100 includes multiple different connectors 102 to receive and record activity information 101 from different kinds of resources, such as from user-operated devices 98 and from enterprise resources 99. In examples, the activity information 101 includes data which identifies an activity the end user performed, using a corresponding user-operated device and/or enterprise resource. The activity information 101 can also include one or more user-identifiers for the respective user that performed the corresponding activity. By way of example, the activity information 101 can include one or more identifiers that reflect any one of a user account, a user-operated device, a session identifier (e.g., such as identified by cookie information stored on a user device), and/or a user signature determined from multiple attributes of the end user's interaction with the respective resource of the enterprise. Additionally, the activity information can include descriptive information about the activity performed. For example, the activity information can include descriptive information relating to an item that is the subject of the end user activity. Still further, the activity information 101 can include contextual information (e.g., time of day, day of week, calendar day, etc.) related to an activity that the end user is detected as having performed.

In some examples, an activity that a given user is detected as performing can be in connection with the end user's access or use of an enterprise resource 99 (e.g., website, mobile device application, chatbot etc.). For example, the mobile device application connector 102A can communicate with a program that executes as part of a mobile application of an enterprise, to receive activity information 101 that pertains to the end user's interaction with the enterprise's mobile application. As an addition or alternative, the mobile device application connector 102A can interact with (i) third-party applications running on the corresponding mobile device, and/or (ii) one or more APIs that are available on the mobile device to obtain activity information from device resources (e.g., satellite receiver to sample for location information, accelerometer and/or gyroscope to sample for movement information, camera, microphone, etc.) and/or software resources (e.g., third-party applications). In such examples, the determined activity information relates to activities which the end user performs on a corresponding mobile device, distinct or independent from any enterprise mobile device application. For example, the mobile device application connector 102A can communicate with one or more APIs on the corresponding mobile device to determine activity information that reflects a user's interaction with a website and/or mobile device application, as well as a location of the mobile device (e.g., as determined from the mobile device satellite receiver). As another example, the mobile device application connector 102A can include an API provided with a corresponding mobile application to obtain sensor information by, for example, reading from a satellite receiver or other location-aware resource of the mobile device, and/or sampling an accelerometer and/or gyroscope of the mobile device. Still further, the mobile device application connector 102A can interface with other programmatic resources of the mobile device, such as with third-party applications or services which run on the mobile device.

In variations, the connectors 102 can include other device and/or programmatic interfaces that execute on a user-operated device. For example, the connectors 102 can include programmatic interfaces which execute to communicate with processes running on different types of user devices (e.g., desktop computer, wearable device). In such cases, the connectors 102 can communicate to receive activity information from multiple types of user devices (e.g., desktop computer, wearable device, etc.).

Additionally, in examples, the website connector 102B can also receive activity information 101 which relate to the interaction of individual users with respect to a website and/or designated web resources of an enterprise. The activity information 101 may be collected through, for example, one or more processes that execute with the website and/or respective web resources, to detect user activity (e.g., page view, search). In contrast to monitoring user devices and resources for corresponding user activity, the website connector 102B can monitor enterprise resources for activity information generated from the interactions of a population of users. In such examples, the enterprise resources can include, for example, a website, a kiosk, or a network-enabled fiducial or encoded object distributed at a given locality. In variations, the connectors 102 can include interfaces to communicate and receive activity information 101 from alternative instrumented venues, such as physical stores that utilize network-enabled resources, such as cameras, beacons, Wi-Fi access points, IoT sensors, and devices.

In examples, the connectors 102 store event records 113 in the real-time activity store 134, where the event records 113 are based on a corresponding activity information 101. With respect to a particular user, the event record 113 can identify an underlying activity or activity type which the end user is detected as performing, as indicated by the respective activity information 101.

In some implementations, each event record 113 can include or otherwise link to one or more attributes that are identified from the corresponding activity information 101. The attributes of a given event record 113 can include parameters that reflect descriptive information about the detected event, such as, for example, information about an item that was the subject of the event, as well as contextual information regarding the performance of the event. Still further, a given event record 113 can be associated with one or more identifiers of a user who is detected as having performed the underlying activity. In some examples, each detected event of the activity information can be associated with a record or data set of the real-time data store 134, to reflect associated information, such as attributes of the event (e.g., descriptive information about the events), and identifiers of the end user performing the respective events.

An event encoding component 120 can encode the event records 113 of the real-time data store 134. In examples, the encoding component 120 assigns a code value to event records 113 based on a predetermined encoding scheme. The event encoding component 120 may, for example, utilize an encoding scheme which assigns code values to event records based on a categorization of the event record. In some implementations, the encoding scheme can assign like code values to event records which have a common categorization. The encoding scheme can utilize, for example, an enterprise profile 124, to determine event categories, where each event category identifies activities that are similar by nature, or deemed similar in regard to their respective probative value for making predictive determinations about the end user. The event encoding component 120 can also sequence events 113 for individual users based on timestamps associated with each event record 113. The activity data store 134 may then associate an encoded event stream with each user.

In some examples, the activity data store 134 can be implemented using cache memory to enable rapid read operations from the learning sub-system 150. A profiling component 130 can copy the contents of the activity data store 134 to a corresponding historical data store 132. In this way, memory management resources can repeatedly flush the real-time data store 134 to remove data that may be aged, based on a predetermined threshold of its (e.g., data older than 5 seconds).

In examples, the profiling component 130 develops user profiles for users of a given user-base (e.g., users who access an enterprise website). The profiling component 130 can include a profile store 137 which includes information about users of the end user-base (e.g., registered user-base). The profile store 137 can associate user-identifiers (e.g., account identifier) with information that is provided about the end user by the enterprise and/or the end user. The profile store 137 can also associate the end user-identifiers with information that is developed or learned about the end user through implementation of processes described by various examples below.

The profiling component 130 can also include logic to identify historical data sets from the real-time data store 134. The profiling component 130 can generate the historical data store 132 from the real-time data store 134, based on events that age beyond a threshold duration (e.g., events which are more than one hour old). The historical data store 132 can store, for individual users, the encoded event streams for event records that have aged beyond the threshold duration of the real-time data store 134.

In examples, the profiling component 130 develops event profiles 131 for individual users. The event profiles 131 can link event records 113 of the real-time activity data store 134 with corresponding records of the historical data store 132. The event profiles 131 can match user identifiers of corresponding event records 113 and their respective encoded event streams with corresponding user identifiers of data sets stored with the historical data store 132.

In variations, vectorization logic 138 can be implemented to generate vector representations of user activity profiles stored in the historical data store 132. The vectorization logic 138 can generate vector representations for encoded data streams associated with the end user in the historical data store 132. In variations, the vectorization logic 128 can also generate the vector representations for encoded data streams which may be stored with the real-time activity data store 134. Accordingly, in examples, the profiling component 130 can provide the learning sub-system 150 with activity profiles of individual users which can include the end user's encoded event stream, as well as vectorized representations of the end user's encoded event stream 121. Additionally, the activity profiles of the individual users can exist in different forms for different time periods. For example, the encoded event stream can include one or more vectorized representations, to represent the portion of the end user's activity stream that is aged beyond a threshold time period (e.g., 1 month or 1 year).

In examples, the learning sub-system 150 can implement multiple types of machine learning and deep learning techniques to process the activity profiles of individual users. In particular, the learning sub-system 150 can implement machine and deep learning techniques to learn from end users who interact with an enterprise across one or multiple digital channels. As described with various examples, the learning sub-system 150 can utilize the encoded event streams 121 for a given subject (e.g., end user) that extends over a window of time, from present moment (e.g., real-time or near real-time) to a selected moment in the past. Additionally, the learning sub-system 150 can utilize vectorized representations of the end user's encoded event stream 121, spanning a timeline that extends beyond the window of time.

In examples, the learning sub-system 150 includes a stream interface component 152 which monitors input into the real-time data store 134. When data pertaining to a new subject (e.g., end user) is received, the stream interface component 152 triggers analysis by one or more of the intelligence processes of the learning sub-system 150. Depending on the model and technique applied, the stream interface component 152 can retrieve portions of the subject's encoded event stream from the historical data-store 132, so as to seamlessly combine the historical and real-time portions of the encoded event stream 121. In variations, the stream interface component 152 can also retrieve the vectorized representations of the end user's encoded event stream. The stream interface component 152 can further query the historical data store 132 in accordance with a configurable window of time. Specifically, the stream interface component 152 can determine the past time and the current time to define the window of time. The configuration of the window of time can be based on, for example, settings for the enterprise, and further optimized for context and use. In this way, the encoded event stream 121 can represent a continuous collection of events for the given user, extending between a past time and a current time. For the respective window of time, the stream interface component 152 can assimilate the encoded event stream 121 using portions stored in real-time data store and/or the historical data store. Additionally, the stream interface component 152 can incorporate the vectorized representation of the encoded event stream for select time periods, such as for a time period that extends beyond that window of time used to assimilate the encoded event stream 121.

In examples, the window of time can be configured to identify the end user activities between any one of (i) fixed start and end times, (ii) activity from a fixed start time until present moment, (iii) activity over prior duration of time, and/or (iv) activity during a measured time-interval (e.g., every 10 seconds).

According to examples, the learning sub-system 150 can process the encoded event stream(s) 121 of the end user to make intelligent determinations for the user, and further to determine an action for the given subject in real-time (or near real-time). For example, the learning sub-system 150 can implement an intelligent process (e.g., using a machine or deep learning technique) to determine a user intent, a current user context, and relevant past user context. From the determinations, the learning sub-system 150 can determine an output that engages the end user, in a manner that is likely to influence the end user action, and further to provide a desired outcome for both the end user and the enterprise. For example, the learning sub-system 150 can generate a notification or other interaction with a subject within a second, or even milliseconds, using the encoded event stream 121 of a given subject, where the encoded event stream 121 includes a continuous set of events detected for the subject across a window of time that extends from the present moment (e.g., using real-time data) backwards in time to a selected moment in the past (e.g., using historical data).

In examples, the intelligent processes of the learning sub-system 150 can include (i) a predictive component 154 to make a predictive determination about the end user, based on the encoded event stream 121; (ii) an intervention component 156 to determine an intervention or engagement (e.g., channel selection for sending notification, timing of notification, content of notification) for the end user; and/or (iii) a customization component 158 that customizes a given user experience, for a given channel (e.g., online) or real-world event, to cause. promote or otherwise influence a particular sentiment, action or outcome from the end user. The intelligent processes of the learning sub-system 150 can further be configured with enterprise specific data and logic. The intelligent processes can generate one or more triggers 155 for the end user, where the trigger 155 can identify, for example, parameters for the action that an event handler 160 is to take with respect to the end user. The parameters can, for example, set the communication channel for engaging the end user (or recipient who is to engage the end user), specify the timing, and further the content. In turn, the event handler 160 can take the action using a respective connector 100 for the selected channel.

In examples, the predictive component 154 can be implemented using a machine-learning process or model, where the machine-learning process is trained to further a particular objective or outcome of the system 100. By way of example, the predictive component 154 can be configured to categorize users in accordance with a set of predictive categories of a categorization schema, where each category of the categorization schema categorizes the end user in accordance with a prediction about the user. The categorization schema can be made specific to a variety of factors, including a desired outcome for a particular context (e.g., increase propensity of user at e-commerce site to make purchase). Still further, in other examples, the learned models of the learning sub-system 150 can model for an outcome of a series of user events. In such examples, the learned models can utilize one of multiple possible machine learning algorithms, such as a random forest algorithm or a neural network, to predict a particular outcome to a sequence of events detected from user activity.

In such examples. the categorization can be determined through implementation of a machine-learning process. In examples, the machine-learning process can use, as input, a sequence of encoded events relating to a particular user activity. For a particular end user, the categorization can reflect, for example, a likelihood that (i) the particular user has a given intent or propensity, (ii) the particular user will take a particular action, and/or (iii) the particular user will respond to a particular intervention in a particular manner.

In some examples, the categorization schema can be a binary determination, such as a determination as to whether the end user is likely to perform a particular action without intervention. For example, the categorization can reflect whether a given end user is likely to make/not make a purchase.

In variations, the categorization schema can predict an outcome for the end user based on a particular type of intervention. Thus, the categorization schema can identify end users who will have a threshold likelihood of having a desired response to a particular intervention. Alternatively, the categorization schema can identify a type of intervention, from multiple possible interventions, that is most likely to result in the end user acting in accordance with a desired output.

By way of illustration, examples recognize that one of the primary reasons end users drop out of an online checkout process is because the end users are not sufficiently assured on purchasing a product, such as high-value items, using an e-commerce channel. In many cases an end user may be indecisive (e.g., "sit on the fence") for prolonged periods of time without taking any further action to conclude the transaction. Examples recognize that such cases of impending or near purchases can be influenced to completion of the transaction (e.g., "converted") if the end user is "persuaded" to visit the store. The learning sub-system 150 can selectively implement machine learning techniques on the encoded event stream of individual end users, to identify end users who can be influenced to perform or complete a transaction. Once such end users are identified, the event handler 160 can implement processes to learn effective engagement actions with respect to individual end users. For example, the event handler 160 can target select individuals, as identified by the learning sub-system 150, with personalized messages to invite them to a retail outlet (e.g., physical store, online store, etc.,), where the end user can sample the product and/or engage with a salesperson (e.g., an in-store sales associate). Alternatively, the event handler 160 can determine a personalized incentive for the end user to visit the store.

In variations, the event handler 160 can select to generate recommendations and other messages to on-floor sales associates relating to end users who are in their stores, or whom they are engaging personally or through another communication channel (e.g., online medium). Still further, examples can improve in-store user experience, by enabling faster checkouts, reduced queue times, and efficient store pick-ups for online purchases. In this way, the system 100 can be implemented to micro-target end users, by way of, for example, end user-specific messaging, communication channels, timing, and/or incentives (e.g., loyalty points, discounts, pricing).

In examples, the learning sub-system 150 can implement intelligent processes to make predictive determinations for the end user. For example, the predictive determination can reflect the likelihood that the end user will complete or otherwise convert a transaction (e.g., purchase an item) if given a particular trigger (e.g., notified that the particular item they were looking at is in the store they are visiting). For example, the predictive determination score can reflect a decimal value between 0 and 1 (e.g., 0.55), reflecting the likelihood of the determination. Still further, in other examples, the predictive determinations can personalize an end user's experience based on the user's past events. For example, if the end user is determined to be researching a particular type of product, the customization component 158 can send a notification or message to a representative of the enterprise to enable an agent to focus the end user's experience about the product they are most interested in.

While some examples of FIG. 1A implement the system 100 in context of online and/or real-world shopping, in variations, the system 100 can be implemented in context of real-time offers, as well as other context of in-session information help, in-session cross-sell upsell, omnichannel personalization and transaction completion, online to branch, event-based interactions, watch lists and alerts, fraud detection and action, in flight triggers based on events, and call center analytics and event pattern detection.

In some variations, functionality as described with examples above, for network computer system 100 can be distributed to the computing devices of the end users or subjects. For example, a mobile application of an end user device can operate to implement some of the functions or features, as described with system 100. In such variations, a mobile device can execute an application that records the occurrence of certain, predefined user events related to the mobile device. To illustrate, the end user may take a picture of a product when walking in a store, and the picture capture, when cross-related to the location of the user, can identify the event. Still further, the end user can operate the app to place an item with an online retailer in a shopping cart. Alternatively, a detected event can correspond to the end user being detected as visiting a location, such as a shopping mall or store.

Figure 1B:
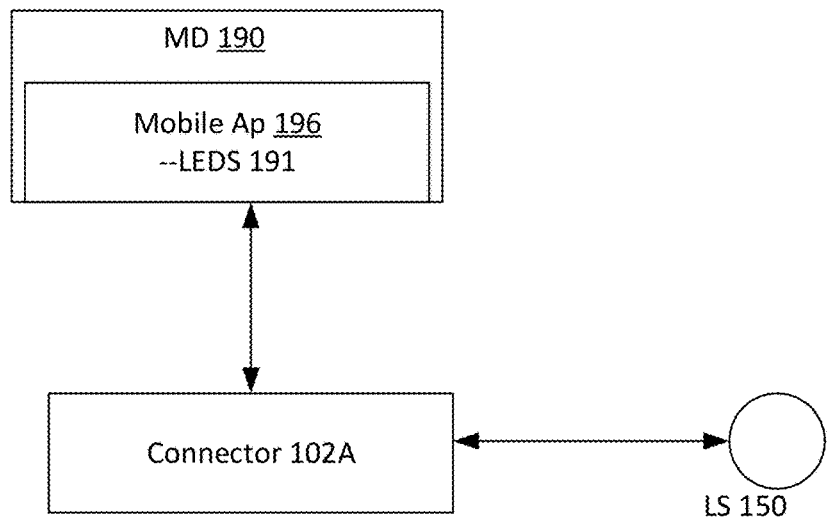
FIG. 1B illustrates a variation in which a mobile device is used as an edge device for a network computer system such as described with an example of FIG. 1A.

FIG. 1B illustrates a variation in which a mobile device is used as an edge device for the network computer system 100. In an example of FIG. 1B, a mobile application 196 can execute on a mobile device 190 to perform operations that include (i) detecting predefined events, or series of events, and (ii) encoding the events, so as to generate a local encoded event stream 191. By way of comparison, the locally encoded event stream 191 can form a truncated portion of a corresponding encoded data stream 121 for the same subject or end user.

The mobile application 196 can further communicate with the system 100 via a corresponding connector 102A. In examples, the mobile application 196 can generate requests that are responsive to, for example, a newly detected event. In turn, the connector 102A can make a programmatic call to the learning system 150, and more specifically to intelligent processes of the learning system 150, such as predictive component 154. The intelligent processes can also be called by the connector 102A to determine, for example, a user intent. In some variations, the intelligent processes can further determine a trigger 155 or action that is to be performed on the device. The connector 102A can respond to the mobile application requests with responses that identify a desired outcome of the intelligent processes (e.g., intent, trigger, action, etc.). In this way, the mobile device 190 of the end user can be operated as an intelligent edge device that utilizes machine or deep learning to implement real-time operations and actions locally on the mobile device 190.

Figure 2A:
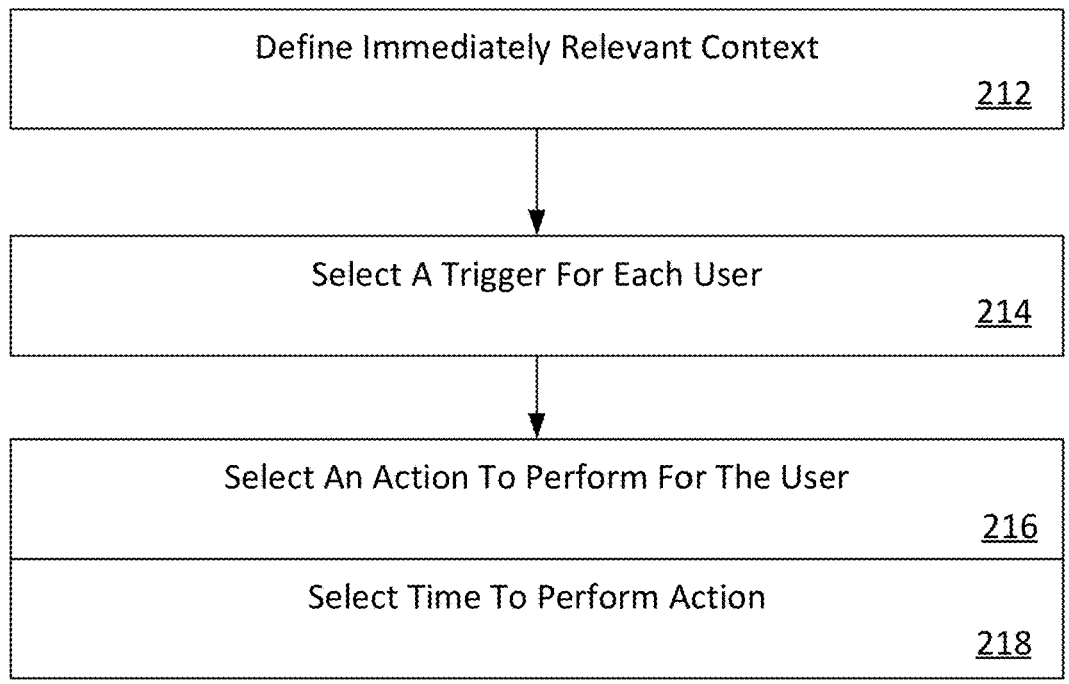
FIG. 2A illustrates an example method for operating a network computer system to engage end users.

FIG. 2A illustrates an example method for operating a network computer system to engage end users. FIG. 2B illustrates an example method for predicting an intent of a user. FIG. 2C illustrates an example method for predicting user intent with respect to a particular type of activity. Examples such as described with FIG. 2A through FIG. 2C may be implemented using a system such as described with, for example, an example of FIG. 1A. Accordingly, reference may be made elements of FIG. 1A for purpose of illustrating suitable components for performing a step or sub-step being described.

With reference to an example of FIG. 2A, the system 100 may be provided with a data set that defines a set of immediately relevant context (210). The immediately relevant context can correspond to, for example, online shopping activity of the end user (e.g., what online retail site and products the end user viewed, what item the end user placed in online cart, etc.), as well as historical activity (e.g., end user's loyalty award program for a given retailer) and real-world activity (e.g., end user walking into store, end user walking into store for a particular purpose).

For a given set of individuals (e.g., end users), the system 100 selects a trigger for each individual (212). By way of example, the system 100 can implement machine learning techniques to determine triggers that are personalized for individuals, and for a specific context or use. Moreover, the triggers can be based on multiple conditions that are specific to the given user. By way of example, the activity information 101 of the user can obtain information from the user's mobile device, to detect that an end user is walking into a retail store. This determination can be made in real-time. Likewise, a time interval between the recorded events of the user can indicate that the end user placed items from the online store into a cart for purchase, and the particular retail location of the end user has the same item as is in the user's online cart.

The system 100 can select an action to perform for the end user. In variations, a time when the selected action is to be performed may also be selected based on the selected action and the likelihood of a desired outcome occurring (218). Still further, the particular channel in which the action is to be performed or initiated may also be selected, based on, for example, the selected action and the likelihood of a desired outcome occurring. The actions can correspond to, for example, sending notifications or messages to the subject or end user, or to an agent who is to interact with the end user, based on an outcome determination that is predictive.

With reference to an example of FIG. 2B, the system 100 can record a sequence of events that reflect the user's activities, as detected with respect to a particular resource (e.g., website) or through a particular computing platform or channel (222). In some variations, for a given user, activity information can be received and recording using one or more multiple connectors 102, such that the detected sequence of events can reflect user activities detected across multiple channels (e.g., activities of the user performed on different types of devices and/or computing environments).

In examples, the system 100 can analyze the sequence of user activities in connection with a current user activity to predict a user intent (224). The prediction component 154 can, for example, analyze the user's encoded event streams 121 (e.g., provided by the historical data store 132), in connection with an identified real-time event or event sequence (e.g., as reflected by event records 113 of the real-time data store 134), to make a predictive determination of the user intent.

In response to making the predictive determination, the learning sub-system 150 can initiate an i intervention that is intended to cause the user to perform a desired user action (226). The initiated event can correspond to, for example, communicating message to the end user, where the message includes, for example, a promotional offer or other content. In such examples, the communicated message can be determined by type, based on a predictive determination of the learning sub-system 150 as to the intent of the user. In variations, the determination of the learning sub-system 150 includes an initial determination as to whether, for example, the user should be subject to an intervention. For example, the predictive determination may be that the intent of the particular user is firm, and likely not subject to change with the intervention. In other variations, the learning sub-system 150 can select the intervention for the user, based on a predictive determination that an intervention of a particular type is most-likely to generate a positive response.

With reference to an example of FIG. 2C, the system 100 can be implemented to define a session boundary, where the session boundary is to include one or more activities that users of a population can perform with respect to a designated set of resources (232). In an aspect, the session boundary can be defined with respect to a set of resources that are published or otherwise provided from an enterprise resource 99. To illustrate, the designated set of resources can correspond to a website operated by an enterprise, the mobile device application published by the enterprise, network sites accessed by mobile devices, and/or a kiosk that is operated by or for the enterprise at a locality of the enterprise. In such cases, the type of user activity can include activities users of a population perform with respect to the enterprise's website, mobile device application or kiosk. In such context, the types of user activity which can be detected can include users visiting a specific website, users launching an application for a mobile device or users operating a mobile device application to access a particular network resource published by the enterprise, or a user's initial set of interactions with a kiosk or locality-based resource.

In such cases, the session boundary can be defined in part by an initiating event, or sequence of events, corresponding to activities of individual users with respect to the website or other designated resource of an enterprise. A session boundary can further be defined by a period of inactivity, at least with respect to the designated resource, preceding the initiating event. By way of example, the session boundary can be defined to correspond to a user initiating an online session (e.g., user opening browser, user launching mobile device application, etc.) in which a website (e.g., e-commerce site) is accessed (e.g., user views or downloads home page or landing page from browser or through mobile device application). As an addition or variation, the session boundary can be defined by the occurrence of a threshold period of inactivity with respect to the designated resource, followed by the initiating event (e.g., user opening browser, user launching mobile device application, etc.).

In some variations, the channel/device connector 102 can include processes that execute on the website resources of the specific website to detect users of the population accessing the website and/or performing other activities (e.g., page view, search, placing item in shopping cart, etc.). As connector 102 can utilize processes running on the website to detect traffic, the recorded information can include activity information for both known and unknown users. Each user to access the website can be identified through a variety of identifiers, such as through an account identifier (e.g., if user logs in to service or account managed through the specific website), cookie or local device data identifier, or through machine identifier. In examples in which the designated set of resources include a website, the type of user activity that can be monitored and detected can include page views, click, mouse over, site search, item selection, item pre-purchase activity (place item in shopping cart), or conversion event. The recorded activity information can further be associated with one or more identifiers. For known users, the identifier associated with the user's activity information can be correlated to historical activity information of that user, such as recorded by historical data store 132.

For each user of a first group, the system 100 can further record a series of session activities, including a first activity that coincides with the defined session boundary and one or more subsequent activities (234). In examples, the first group of users can correspond to known users, or a subset of known users (e.g., known users who have accounts with the enterprise of the designated resource). For known users, the activity information can be recorded across multiple sessions, with each session being marked by a session boundary.

In examples, the recorded activity information can reflect events and attributes of the event. For example, the activity information can reflect an event of search, and an attribute of the event may correspond to the search term. To further the example, a subsequent event, as identified by the activity information, can reflect a page view, with attributes of one or more product identifiers (e.g., product name, manufacturer name, SKU, etc.). Additionally, the activity information can reflect contextual information, such as (i) information about the device or application the end user used during the particular session, (ii) the timing of the activity (e.g., time of day, day of week, month of year, etc.), (iii) information about how the end user may have initiated the session (e.g., through use of a landing page, bookmark or subscription link), (iv) geographic information about a location of the end user (e.g. if available), and/or (v) whether the end user responded to a promotional event (e.g., sale on site in connection with a marketing event) and whether the promotional event related to the item which is the subject of a subsequent conversion event.

Additionally, the activity information of known users can be processed for the occurrence of a desired activity. In examples in which the designated resource is an e-commerce site, the desired activity can correspond to, for example, a conversion event where the end user purchases an item (e.g., product, service, etc.). In variations, the conversion event can be defined as the user placing item in the shopping cart, or requesting more information about an item. The desired activity, or type of activities can be predefined for a given enterprise, based on, for example the enterprise profile 124.

In examples, the event encoding component 120 can process the recorded activity information of known users to identify events, and further to determine a sequence amongst the identified events. The identified events can be encoded, and each event may also be associated with corresponding attributes as detected through the respective connector 100 to, as described. In this way, the real-time data store 134 can store event sequences in association with identifiers of known users, for corresponding sessions in which the known users utilize a website or other resource of the enterprise.

Additionally, the sequence of events can further reflect an outcome with respect to whether the user performed a desired activity. For example, the profiling component 130 can determine an event sequence subset for each known user, where the particular event sequence subset includes (i) a first-in-time event, such as an initiating event as defined by the boundary, and (ii) a last-in-time event, corresponding to a conversion event or an event in which the session is terminated (e.g., user logs off forecloses the program used to access the enterprise resource).

The learning sub-system 150 of system 100 may further develop one or more models to predict an outcome of a user session, where the models incorporate learning using session activities of known users (236). The developed models can, for example, utilize a random forest or neural network methodology. In examples, the prediction component 154 can aggregate event sequences of known users during individual sessions, where the aggregated sequences can reflect the occurrence or nonoccurrence of a conversion event, as well as termination and/or the initiation of sessions as defined by the session boundary. Through aggregation, the prediction component 154 can determine patterns reflecting the occurrence of specific events or event types (e.g., any one of multiple possible events relating to a particular attribute, such as a particular product or type of product), and a predicted likelihood of an outcome when determined patterns occur amongst the known users. In some variations, the predicted outcome is made for a particular user's current session, using such a determined pattern for that user. In some examples, the prediction component 154 can utilize the identified aggregations to develop, for example, an ensemble of models, utilizing analysis of events identified from activity information of known users.

In examples, the aggregation of events and/or event types can reflect a graph-type data structure, where nodes of the graph reflect the occurrence of an event, event sequence, or event(s) of a particular type. In such examples, the node levels of the graph-type structure can reflect a relative time in a user session when a corresponding event, event type or set of multiple events occur. For example, an initial level can reflect various events or event types which are possible initiation events for a session, as defined by the boundary session. Each node can further be associated with one or more possible outcomes. Thus, for example, a branch following a given node can be associated with the likelihood of an outcome, where the outcome reflects whether a desired activity occurred. Through aggregation, a likelihood of one or more outcomes can be determined at nodes of each level. Additionally, the uncertainty of a particular outcome occurring can lessen at each level, such that a particular outcome becomes more certain as the node level of an event sequence increases.

Depending on implementation, the likelihood of the outcome can be represented as a probability, and a particular outcome can be deemed likely or sufficiently likely if the probability exceeds a threshold value (e.g., if probability of a given output is greater than 50%, 60%, 70% etc. then the outcome is deemed likely). In other implementations, the likelihood of an outcome occurring at a particular node can be binary (e.g., outcome likely to occur/not likely to occur), trinary (e.g., outcome likely to occur in current session, outcome likely to occur in a current or future session, outcome not likely to occur), or of a defined set. Still further, the likelihood can also be associated with a confidence value.

Accordingly, the prediction component 154 can use the activity information of the known users to develop model(s) to predict a likelihood of particular outcome following an initiation event of a defined session. The models can further indicate a confidence or certainty with respect to the determination of the likelihoods, with the confidence of certainty of the determination increasing as a length of the event sequence increases, reflecting the user performing additional activities during the session.

As an addition or variation, the prediction component 154 can develop models to be specific to a categorization of the end user. In particular, some examples provide that the prediction component 154 categorizes users in accordance with a predicted intent of the end user, where the predicted intent can be determined from historical information about the end user. In the context of an e-commerce site, the categorization can reflect the end user's willingness or propensity to perform a conversion event (e.g., make a purchase) when initiating an online session.

While some examples such as described with steps (232)-(235) can be utilized to predict in-session outcomes, in variations, the determined outcomes can be used to develop predictive models for predicting in-session outcomes for detected user-activities, irrespective of historical information or detected activity patterns. To illustrate possible variations, such developed models can be used to predict outcomes for unknown users (e.g., users for whom detected activity does not correlate to historical or profile information). According to examples, the system 100 can further monitor the designated set of resources for activities of users, including users who are of an unknown class (238). For users of the unknown class, the system 100 may not be able to link a recorded identifier of the end user's current session with an identifier that is associated with any prior historical information about the end user. For example, such unknown users may correspond to users who have not signed-in to their account with the designated website, users who have no account with the designated website, or users whom system 100 has not previously identified or recorded activity information in connection with the designated website. Still further, users of the unknown class may include users who are not recognized by system 100 as a result of, for example, the end user accessing the website or designated resource of the enterprise using a channel or device where the user's identifier is unknown and/or not persistent.

In some examples, the website connector 102B can receive site traffic information from a process or program that runs with the particular site. The real-time data store 134 can record activity information generated from the monitored site, with the activity information reflecting an event, attributes of the event, and one or more identifiers for the end user who performed the activity of the event. The profiling component 130 can process the recorded activity information for identifiers of the end user, to link the end user with, for example, prior session profiles and/or historical information about the end user. For users of the unknown class, the initiation of a session (as defined by the site boundary) is a first encounter for the system, as a result of the end user being unknown. Additionally, the system 100 can record activity information for users who are of (i) a known class, such as users for whom the recorded session profile can be linked to historical information, using persistent identifiers; and/or (ii) a partly unknown class, including users associated with recent session profiles (e.g., session profiles which occurred in same day or same week), as a result of, for example, non-persistent session identifiers.

For each user of the unknown class, the predictive models can be used to determine a likelihood of the end user performing a desired activity, based on an event sequence of the session profile, reflecting the activities of the end user during a current session (240). In examples, the desired activity can correspond to conversion events, such as the end user purchasing an item, subscribing to a service, or performing some other activity that is classified as a conversion event for the particular site. The likelihood determination can reflect a probability and/or an outcome, as well as a confidence level of the determination.

In examples, the prediction component 154 can repeatedly make the determination during the given user session for outcomes within or outside of the given user session. For example, the likelihood determination of the end user performing the conversion event can be initiated after a minimum number of events are recorded in the end user session, and the determination can be updated repeatedly with detection of additional events which update the end user's session profile. In some variations, the likelihood determination can be repeated after individual events are recorded to reflect the end user's session activities, until the confidence value of the determination reaches a minimum threshold. Still further, in other variations, the likelihood determination can be repeated until a determination is made that the end user is likely to not perform a conversion event. The determination of such likelihood can be reflected by, for example, a probability value, reflecting the likelihood determination of the end user performing the conversion event, that is less than the minimum threshold.

In examples, the intervention component 156 uses the likelihood determination of the end user performing the conversion event to determine whether the end user should receive an intervention. In examples, if the likelihood determination of the prediction component 154 is that the end user will perform the conversion event, then the intervention component 156 identifies the end user to not receive any intervention. On the other hand, if the likelihood determination is that the end user will not perform the conversion event, then the intervention component 156 identifies the end user as a candidate for receiving an intervention.

In some implementations, the intervention component 156 identifies individual users to receive or not receive interventions. For example, those users that are to receive interventions may be identified to the enterprise system, based on the respective user session identifier, and logic executing on enterprise system can select and deliver in intervention to that user before the end user ends his or her session. As described, however, if the end user is determined to likely perform the conversion event, no identification of the end user session profile may be made, in order to preclude the enterprise system from setting that user and intervention. In this way, interventions are utilized on an as needed basis, rather than globally implemented for users of the website.

Still further, in some examples, the prediction component 154 can determine the user intent, and further determine a time interval, action, or series of actions which the user is likely to perform before the user performs a particular action associated with a particular intent. In such examples, the intervention component 156 can select an intervention for the user that is predicted to reduce the time until when the user performs the desired action. Thus, for example, the prediction component 154 may determine that a user is likely to make a purchase, but the user may first place the item in a shopping cart, and then perform the action of completing the purchase at a later time. In such cases, the selected intervention may be selected to cause the user to complete the purchase shortly after the item is placed in the online shopping cart.

Figure 3A:
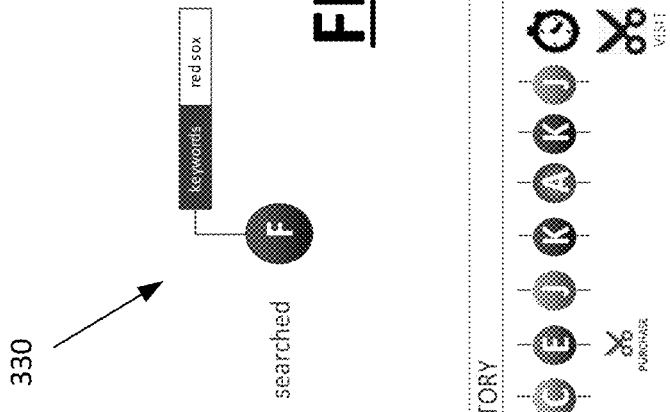
FIG. 3A through FIG. 3C illustrate example data structures of an encoded sequence of events.
Figure 3B:
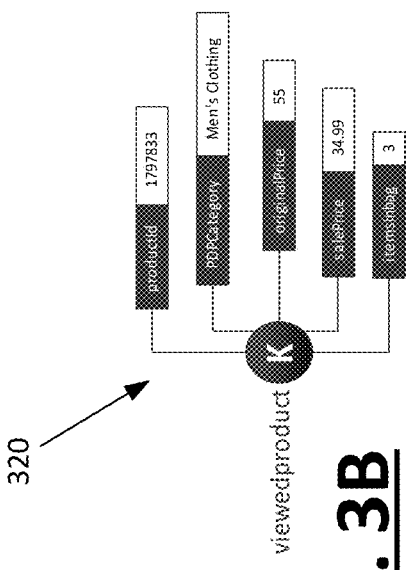
Figure 3C:
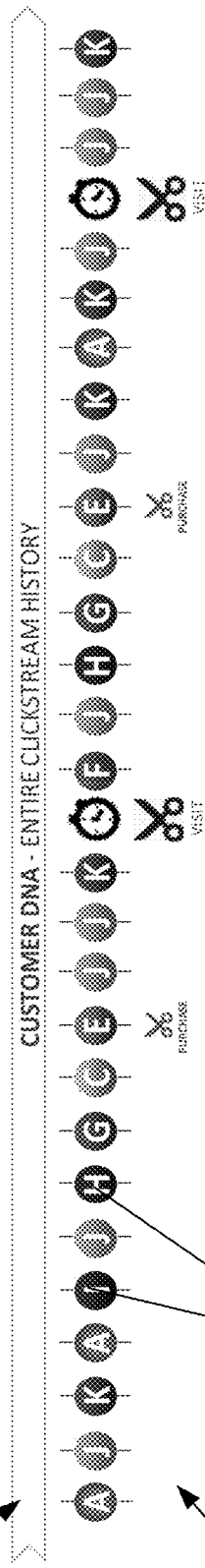
Figures 4A, 4B, 4C:
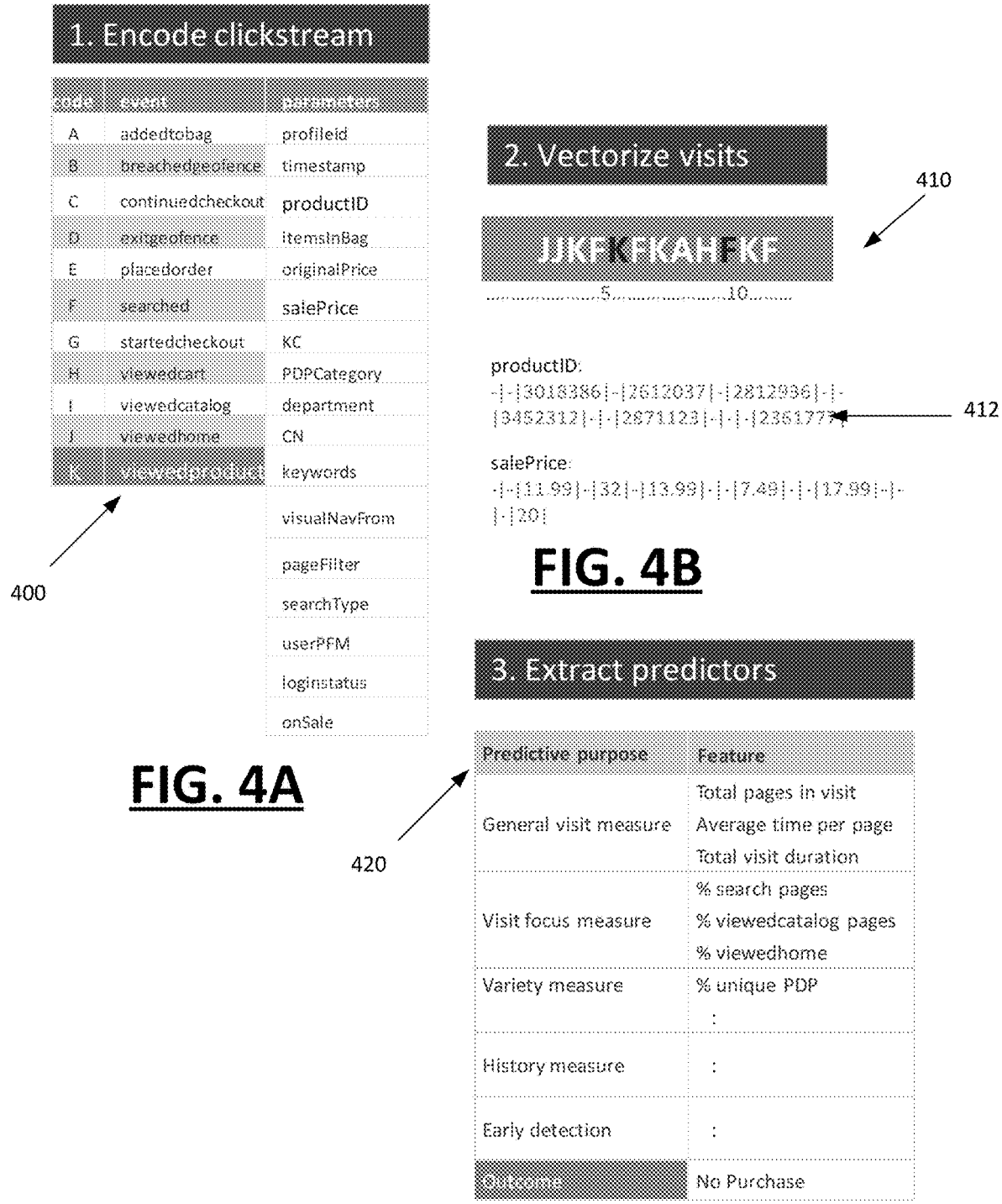
FIG. 4A-4C illustrate example data structures for use with an encoded event stream.
Figure 5:
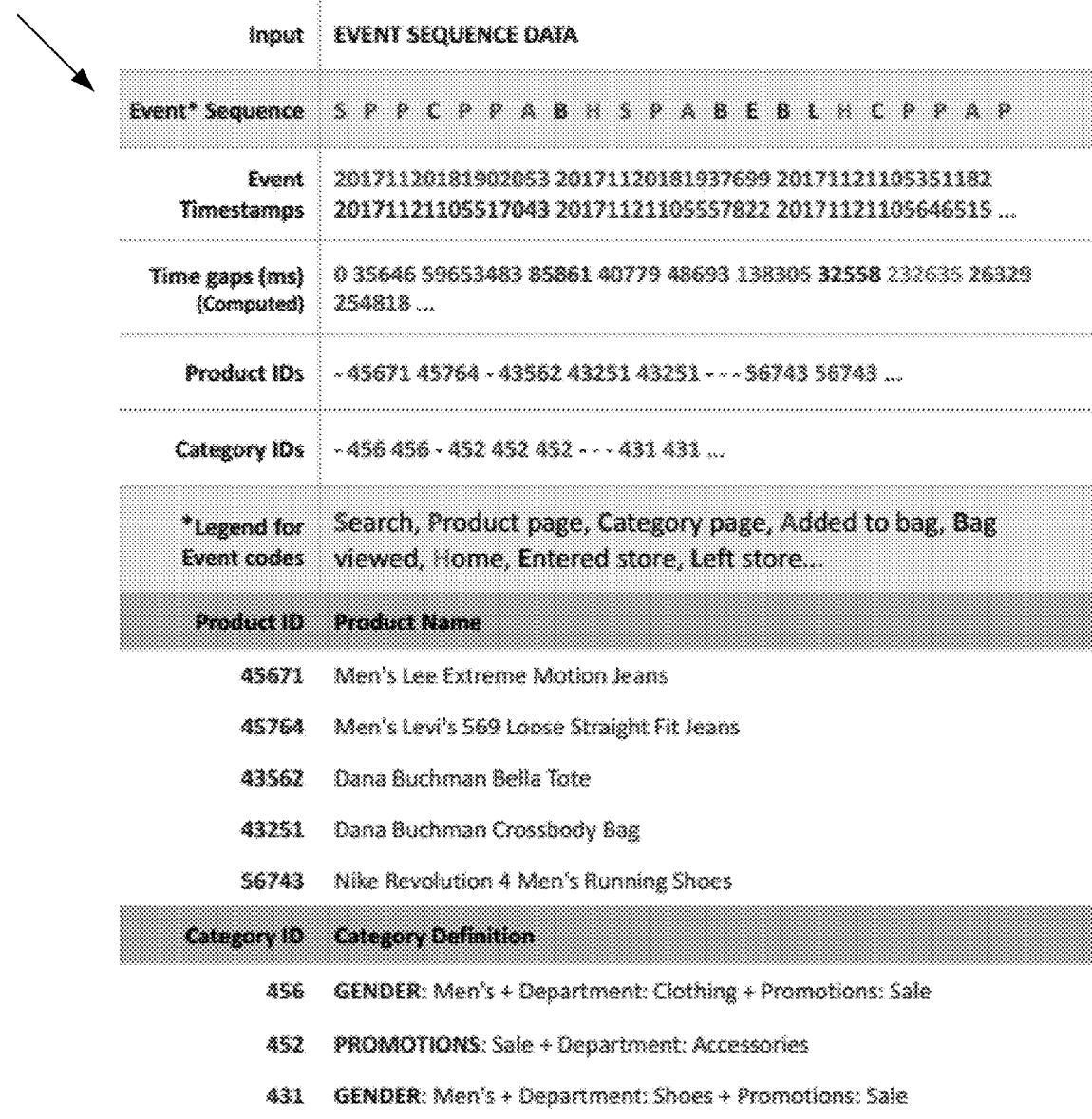
FIG. 5 illustrates an example data structure to map a detected event for an end user to other types of information.

FIG. 3A through FIG. 3C illustrate data structures that represent detected activities of an end user. FIG. 4A-4C illustrate data structures for encoding a sequence of events for an end user. FIG. 5 illustrates a data structure to map a detected event for an end user to other types of information. In describing examples of FIG. 3A through FIG. 3C, FIG. 4A through FIG. 4C, and FIG. 5, illustrate examples of an encoded data stream 121, such as described with FIG. 1A and FIG. 1B. Accordingly, in describing examples of FIG. 3A through FIG. 3C, FIG. 4A through FIG. 4C, and FIG. 5, reference may be made to elements of FIG. 1A and FIG. 1B to illustrate examples, functionality and/or to provide context.

With reference to FIG. 3A, the data structure 300 represents an encoded sequence 310 of events (e.g., encoded event stream 121), where the detected events can correlate or represent detected activities of an end user. The encoded sequence 310 can include event identifiers 311 (e.g., letters) sequenced by time of occurrence. The event identifiers 311 can represent an event type or category. In examples, the encoded sequence 310 can be generated by, for example, the system 100 utilizing connectors 102 to interface with a user operated device 98 (e.g., mobile device, desktop computer, etc.), such as in the case of the end user operating an app or browser.

In examples, the encoded sequence 310 can include event identifiers 311, representing events identified across one or multiple channels, where each channel represents a particular type of connector 102 and/or interface. Accordingly, in some variations, the encoded sequence 310 for a given end user can include events detected across multiple channels or end user devices (e.g., event detected on user mobile device (or mobile app) and on user desktop or browser). To generate the encoded event stream 310 for a given user across multiple channels, some variations provide that system 100 matches user identifiers (e.g., account identifier(s) used by end user when performing corresponding activities) and/or other types of user identifiers (e.g., machine identifier, mobile device phone number, etc.).

Further, the sequence of event can identify or otherwise be associated with contextual information, such as the location of the end user when the event occurred and/or the channel from which the event was detected. The event data stream 121 can further be contextualized and personalized for the end user, so as to be representative of a subject's enterprise-relevant activities or activity patterns. Such detected activities or activity patterns can, for example, enable highly customized interactions with customers. As described with other examples, the encoded event stream 121 can be analyzed for patterns, using, for example, machine learning, deep learning and other learning techniques.

With further reference to an example of FIG. 3A, the encoded event stream 310 can be processed and analyzed (e.g., such as by learning system 150) to predict, for example, the user's intent with in conjunction with a current activity of the user. For a particular event, the encoded event stream 310 can be processed or analyzed to determine one or more portions 312 which are relevant (or most relevant) to a particular context (e.g., current event detected for user). Depending on implementation, a portion of the encoded event stream 310 can be determined relevant based on, for example, a recency or window of time preceding a current context (e.g., current event detected for user), where the relevant window of time can be configured or otherwise selected based on, for example, the particular context and/or predictive model.

FIG. 3B and FIG. 3C illustrate examples of data structures 320, 330 to represent individual events. As shown, each of the event identifiers 311 of the encoded data stream 310 can represent a detected event (e.g., viewing a product in an e-commerce site; searching for a product in an e-commerce site). Each event identifier 311 may be associated with a set of contextual information pertaining to that event. In some examples, the contextual information may include parametric information which can be defined or otherwise provided by an enterprise operator (e.g., publisher of website).

FIG. 4A-4C illustrate example data structures to represent an encoded 'click stream' of an end user. With reference to FIG. 4A, an encoded click stream 400 is an example of an encoded event stream 310 (e.g., see FIG. 3). In examples, the encoded click stream 400 can comprise a set of multiple records, with each record representing an event of the user 'click' (e.g., user operating input device on a computing device to select an interactive component on a website). By way of example, system 100 can encode a sequence of click-events, with each being represented by a corresponding event record 113.

In some examples, at least some of the contextual information can be parametrized and associated with corresponding event records. In some examples, the event encoding 120 can collect event data 111 in real-time, and apply a code to specific parameters associated with the event data.

With reference to an example of FIG. 4B, a data structure 410 provides a vectorized data set 412. As described with an example of FIG. 1A, the event encoding 120 can use the enterprise data to vectorize the events. For example, certain events can be associated with specific products that were the subject of the event, and the vectorization can identify information about a particular event type or characteristic for certain events of the user's encoded click stream 400. In examples, the events of a given sequence may be parsed into sub-components (e.g., subsequences). In an example of FIG. 4B, the vectorization can be based on a common attribute or event characteristic. For example, individual vectors may be generated to represent product identifiers and/or sales price with respect to corresponding events.

With reference to an example of FIG. 4C, a data structure 420 may provide patterns or other indicators of a vectorized data set for a given user. In examples, the system 100 can process the encoded event streams (e.g., using processes of the learning sub-system 150) to extract patterns or other indicators of an end user intent or outcome. The learning system 150 may, for example, develop and apply models to predict user intent or behavior based at least in part on the extracted patterns.

FIG. 5 illustrates an example data structure 500 to map an event (or sequence of events) in an encoded event stream to a contextual information of the enterprise (e.g., products, category of products, etc.). An example data structure 500 can be based on a designed schema that accounts for the enterprise customer base and objectives.

Figure 6:
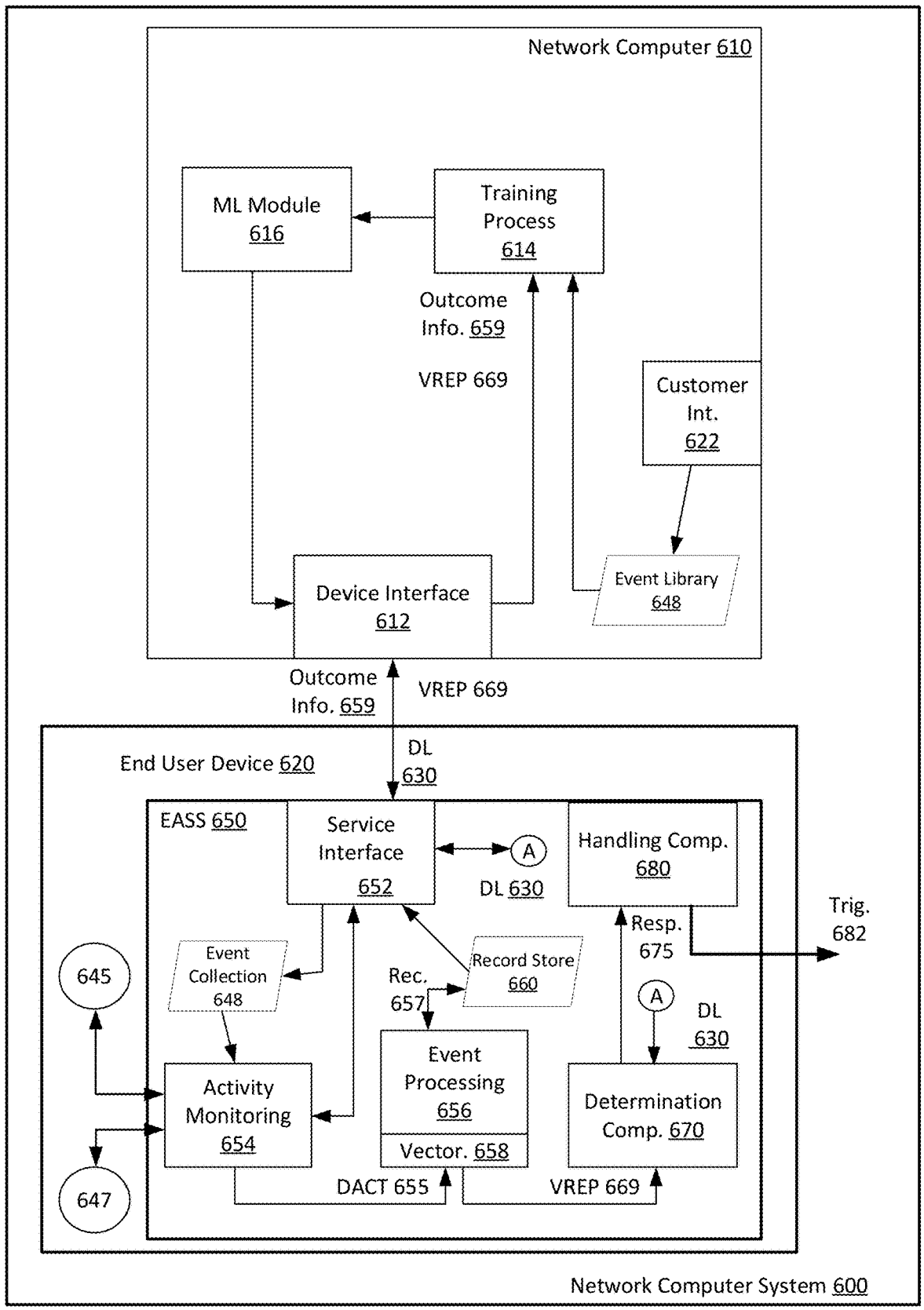
FIG. 6 illustrates a distributed network computer system for detecting real-time events, according to one or more examples.

FIG. 6 illustrates a distributed network computer system for detecting real-time events, according to one or more examples. As shown, a network computer system 600 includes one or more network computers 610 that communicate across one or more networks with end user devices (represented in FIG. 6 by end user device 620). In an example shown, the network computer 610 can correspond to, for example, a server, or combination of servers, and the end user device 620 can correspond to, for example, a desktop computer or mobile device (e.g., tablet, cellular telephony and/or messaging device, wearable device, etc.).

According to examples, the end user device 620 can implement an event analysis sub-system 650, using, for example, a dedicated service application, or a combination of applications and/or programmatic functionality. The event sub-system 650 can execute on the end user device 620 to communicate with the network computer 610, in order to receive and implement functionality for detecting and responding to real-time events on the end user device 620. As described, the functionality provided to the end user device 620 can include decision logic 630, which can be generated from machine learning processes of the network computer 610, for deployment to end user devices (as represented by end user devices 620), to enable end user devices to use machine learning in detecting and responding to real-time events.

According to examples, the network computer 610 includes a device interface 612, a training processes 614 and one or more machine learning models 616. The device interface 612 can operate to provide functionality, including instructions and data sets, to the end user device 620. Additionally, the device interface 612 can receive information from the end user device 620, including feedback which the network computer 610 can use for training and updating purposes.

The machine learning models 616 can include one or multiple machine learned models 616 that are trained to generate an output that is indicative of a user intent or interest, in response to receiving input in the form of sequenced events that correspond to detected user activities. The network computer 610 may store an event library 608 that includes data to define numerous predefined events. In examples, the events of the event library 648 can correspond individually, or in combination with other events, to activities that can be detected by the end user device 620.

The event analysis sub-system 650 can be implemented as, for example, an application that a user can launch on the end user device 620. According to an aspect, the event analysis sub-system 650 can be dedicated, or otherwise configured for use with the network computer 610. When running on the end user device 620, components provided by the event analysis sub-system 650 may include a service interface 652, an activity monitoring component 654, an event processing component 656 and a determination component 658. The service interface 652 can communicate over one or more networks with the device interface 612, to exchange data sets as described by various examples.

In examples, the network computer 610 communicates at least a portion of the event library 608 to the end user device 620 via the device interface 612. The end user device 620 can store an event collection 648, corresponding to a portion or complete version of the event library 608.

The activity monitor 654 can interface with and monitor one or more device resources, using one or more programmatic resources 645 and/or sensor resources 647. The programmatic resources 645 can include, for example, third-party applications, plug-ins, or services available through the end user device 620. By way of example, the programmatic resource can include a browser interface that enables the activity monitor 654 to detect certain types of browser activity (e.g., search for product, product viewing, placing product in shopping cart, purchasing product, etc.). The sensor resources 647 can include, for example, an interface to the device's satellite receiver, to obtain a current location of the end user device 620. As an addition or alternative, the sensor resources 647 can include an interface to a motion sensor of the end user device 620 (e.g., accelerometer, gyroscope), an environmental sensor of the end user device (e.g., barometer, temperature) and/or interfaces to a camera or microphone of the end user device. In some examples, the activity monitor 654 accesses or otherwise utilizes logic for processing output from specific sensor resources 647. Likewise, the activity monitor 654 can access the utilize logic for detecting and determining information about different types of programmatic activities, such as e-commerce activities. In this way, the activity monitor 654 can interface and monitor programmatic and/or sensor resources 645, 647 to detect device usage that matches one or more definitions for corresponding events of the event collection 648.

In examples, the activity monitor 654 detects specific types of user activities that are monitored through the programmatic resource 645 and/or the sensor resource 647. When the activity monitor 654 detects a relevant activity, the activity monitor 654 can also determine information that is relevant to the activity. For example, when a user purchases an item online, the relevant information can include, for example, (i) the number of page views that were detected from the user in the network session, before the user made the purchase, (ii) the number of products the user viewed, (iii) an identifier of the product (e.g., SKU), (iv) a price the user paid for the product, and/or (v) information about any promotion the user used when making the purchase. The activity monitor 654 can communicate detected activity, including predefined relevant information about such events, to the event processing component 656.

The event processing component 656 can implement various tasks in connection with detected events. For example, the event processing component 656 can structure the information about detected events, by generating a record 657 of the detected activity. In processing the detected activity, the event processing component 656 can match the activity to one or more of the events as defined by the event collection 648. When a detected activity 655 is detected as an event (or events) as provided by the event collection data 648, the event processing component 656 can associate a code value to the event, and further populate a current event record 657 to reflect the code value and other information determined from the detected activity. In some examples, the code value of the event can reflect a category designation of the event. Additionally, the current event record 657 can include attributes which reflect specific information that was determined from the detected event. Additionally, the current event record 657 can include a timestamp to reflect when the corresponding user activity occurred.

The event processing component 656 may maintain an event record store 660 to receive and store the current event record 657. Additionally, the event record store 660 may include a collection of historical event records 651, with each historical event record 651 providing information about a previously detected event of the respective user. In examples, the records 651 can include historical information regarding detected events of the user. Still further, the historical records 651 of the record store can include or reflect an encoded series of events for locally detected events (corresponding to user activities that are defined for those events). Additionally, the record store 660 can reflect the detected events as a series, or in sequences, based on the timestamps that are associated with the individual records.

According to examples, the event processing component 656 can retrieve historical event records 651 in connection with the event processing component 656 encoding and analyzing the current event record 657. The event processing component 656 can update the record store 660 with the current event record, and vectorization component 658 can vectorize the updated record store 660 to generate a vector representation 669 that is based at least in part on the encoded event stream of the user. The event processing component 656 can further analyze the vector representation 669 in connection with the current event record, in order to make a predictive determination of the user's intent or interest. In some examples, the event processing component 656 can, for example, parse events, as recorded by the record store 660, to identify sequences of events which share a characteristic of relevance (e.g., by time, by type of activity of user performed, in relation to particular product or service, etc.). The event processing component 656 can also group events by criteria of relevance and/or time, so as to identify relevant events in accordance with a series or sequence. In this way, the record store 660 itself may record an entire series of events according to a timeline of occurrence, while separately identifying sequences or series of events in accordance with, for example, criteria of relevance.

In examples, the separately identified event sequences or series can be analyzed collectively, for decision making.

In some examples, the event processing component 656 applies instructions or logic received by the network computer 610 to determine event sequences or series. The determinations made on the end user device can reflect, for example, a pattern or trend with respect to a user intent or interest.

In some examples, the vectorization component 658 can generate vectoral representations 669 of event sequences, based on for example a determination that a set of events are relevant to one another, and/or in response to a current user activity. The record store 660 may also store vectorized forms of individual events, as well as vectoral representation of identified event sequences or groups, where the vectoral representation applies to the collective group.

According to examples, the event analysis sub-system 650 may also include a determination component 670, which responds to detected events by determining an appropriate outcome for a current or recently detected event. The determination of the outcome can be based on, for example, analysis of prior events in combination with a current event. As described by some examples, the analysis of prior events can include analysis of multiple events, in sequence or clusters, where the events are deemed relevant to one another, such as when the events share a particular characteristic (e.g., e-commerce activity).

As an addition or alternative, the determination component 670 can analyze prior events to detect patterns or trends which may be probative in predicting, for example, a user intent or interest as to a particular subject (e.g., item of commerce). In examples, functionality for analyzing events in sequence can be integrated with the event analysis sub-system 650, such as in the form of a program that runs with the event analysis sub-system 650. In some examples, the determination component 670 receives a vector representation 669 for a relevant set of event, which may include the current event record.

In some examples, the determination component 670 can also implement the decision logic 630, which can be communicated by the network computer 610 via the service component 652. The decision logic 630 can identify, for example, machine-learned rules, steps and/or conditions, for the determination component 670 to employ using event sequences (or other groupings), in order to identify an outcome that corresponds to a particular action, such as selection and deployment of a particular trigger. In this way, the end user device 620 can provide a machine-learned response, without actually implementing a machine-learning process or model. The determination component 670 can, for example, provide a real-time response 675 that corresponds to the generation of a trigger 682, via the local event handler 680.

The determination component 670 can repeatedly receive updated versions of the decision logic 630, and the updates can be responsive to recent or current events which are detected on the end user device 620. In examples, the decision logic 630 can be based on, for example, a prediction that a user is more likely to respond to a particular trigger (or other outcome) in a desired way. For example, the decision logic 630 may reflect numerous possible machine-learned outcomes which are based on past event analysis of the user. Additionally, the decision logic 630 may be structured to be determinative of a particular outcome based on any one of numerous possible future event types which may occur in the future. In this way, the user device 620 may use the decision logic 630 to generate an outcome that is based in part on past event sequences that are learned predictors of user intent (e.g., to purchase a type of product, subject to concerns about shipping or reliability of the product). The decision logic 630 may further reflect the machine-learned determination that the particular user, for who the sequence of events is detected, is more likely to perform a desired action (e.g., purchase item) as a response to a particular trigger (e.g., offer to provide shipping warranty). The decision logic 630 can associate one or more sequence of events with such an outcome (e.g., user has intent to purchase, but is concerned about shipping and reliability), resulting in the event handler 680 signaling the appropriate trigger 682 (e.g., promotion to provide a shipping warranty to the end user).

According to examples, after the determination component 670 signals the event handler 680 to generate the trigger 682, the activity monitoring component 654 continues to monitor the programmatic resources 645 and/or the sensor resources 647. The event processing component 656 can process detected activity 655 for events that are indicative of the user response to the trigger 682. Such events, reflecting the user response, can be recorded in the record store 660, and further communicated to the network computer 610 via the service interface 652 and the device interface 612. The communications can be made responsively to the trigger 682 being generated, or provided asynchronously, such as in batch or at a later time. In some examples, logic residing with the network computer 610 can process event information following the determination component 670 initiating the trigger 682, in order to determine whether the user's response to the trigger 682 was in accordance with a predicted or desire user response.

In variations, the determination component 670, for example, can analyze the detected activities 655 of the user to determine if the activities reflect an event that confirms a predicted outcome for the decision logic 630. The determination as to whether detected events that follow the trigger 682 confirm (or not) the predicted outcome can be provided to the training process 614 as outcome information 659. The outcome information 659 can be communicated to the training process 614 along with information that identifies, for example, the predicted outcome for the particular user. For example, the event analysis sub-system 650 may communicate the most recent vector representation 669 of the record store 660, to enable the training process 614 to match the detected outcome with the information used to determine the predicted outcome. The training process 614 can use the outcome information 659 to train and update the machine model 612. In examples, once the machine model is updated 612, the decision logic 630 is also updated and communicated back to the end user device 620.

In examples, the network computer system 600 can enable updates to the event library 608. An enterprise interface 622, for example, can enable an enterprise operator to specify new event definitions, along with desired parametric information, for purpose of providing select triggers (e.g., promotions) to users who may have a specific intent or interest (e.g., inclination to purchase a product, or use a merchant, etc.). Additionally, the event library 648 can be updated with, for example, passage of time (e.g., remove old event definitions), or processes that analyze recorded events on end user devices to identify obscure or low-value events. In this way, the event library 608 can be maintained relevant and robust to changing needs of enterprise users (e.g., merchants).

The event library 648 can periodically, or in response to changes, be used by the training process 614 to retrain or update the machine-learning module 616. In some examples, the training process 614 can utilize a supervised and iterative process, where events are fielded to groups of users, with samples of end user devices returning outcome information 659 that identifies the predictive value of an event. The training process 614 can tune the model(s) of the machine learning module 616 to accommodate new events 616. Additionally, the training process can, over time, segment outcome information 659 by user or user category, so as to tune the machine learning models for specific users, or categories of users. The resulting decision logic 630 can thus incorporate user- or class-specific logic and potential outcomes.

Figure 7:
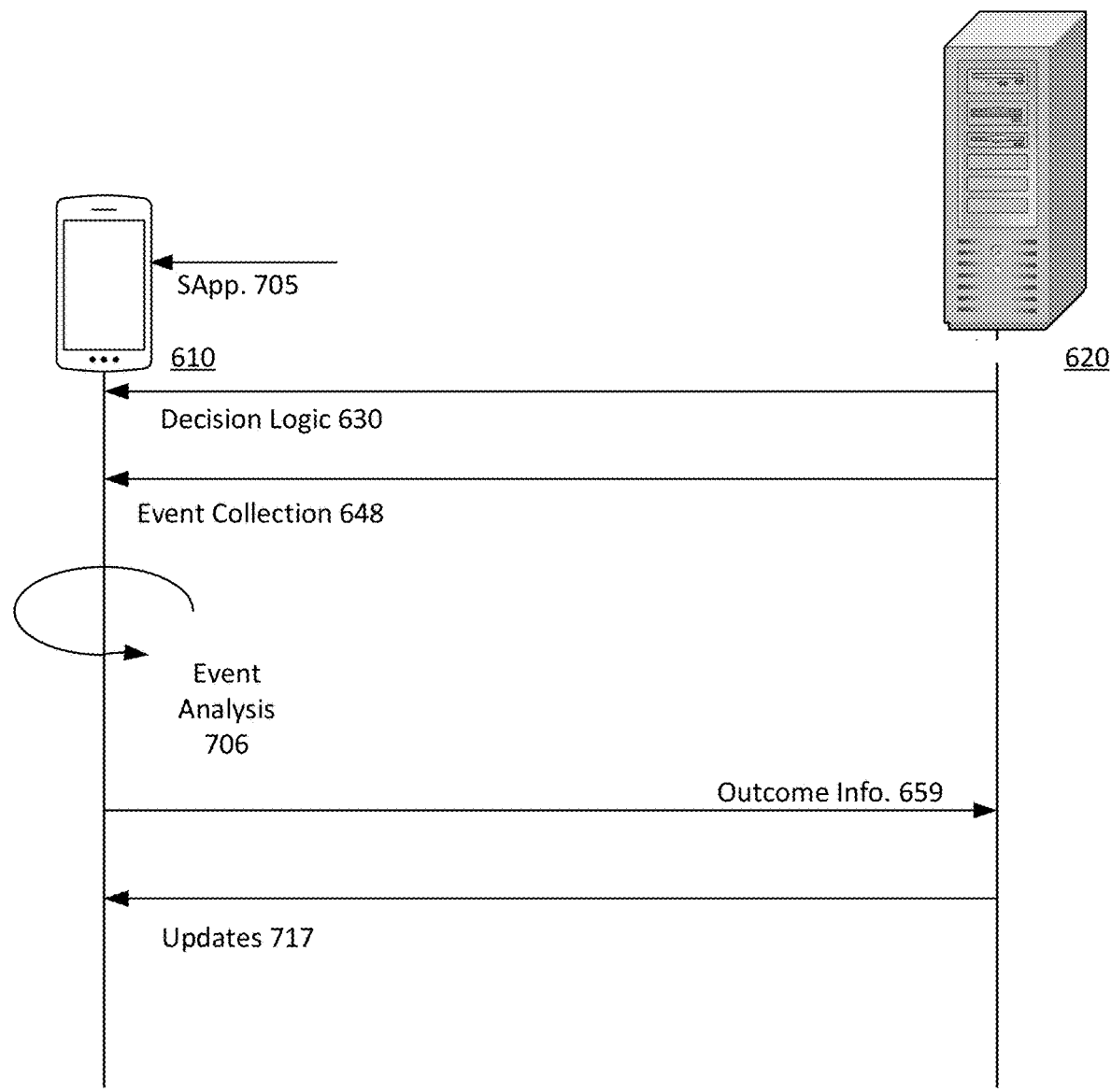
FIG. 7 illustrates a sequence diagram as between a network computer and end user device, communicating to implement real-time event analysis using a distributed architecture.

FIG. 7 illustrates a sequence diagram as between a network computer and end user device, communicating to implement real-time event analysis using a distributed architecture. In describing an example of FIG. 7, reference is made to elements of FIG. 6 for purpose of illustrating suitable components or elements for performing a step or sub-step being described.

In FIG. 7, the network computer 610 communicates with the end user device 620 across one more networks. In some examples, the end user device 620 can download a service application 705 to communicate with the network computer 610, to receive functionality as described. The end user device 620 may download the service application 705 from, for example, an application data store (e.g., "app store"), where the service application is dedicated or configured to communicate with the network computer 610. In some examples, the service application 705 can be launched to provide the event analysis sub-system 650.

When the service application 705 is running, the network computer 610 sends decision logic 630 to the end user device 620. As described elsewhere, the decision logic 630 can be sent repeatedly, such as in response to the decision logic 630 being updated. The end user device 620 may receive the decision logic 630 using the service application 705. As described with an example of FIG. 6, the decision logic 630 may be machine-learned, based on events that affect a group or population of users. Over time, the decision logic 630 can be tailored for the specific user, based on, for example, vectoral representations of the prior events that have been recorded on the end user device 620 for the user.

In examples, the network computer 610 sends the end user device 620 the data event collection 648, which can also be received by the end user device 620 operating the service application.

The end user device 620 may execute the service application 705 to implement the decision logic 630, using the event collection 648. When the service application 705 is executed, event analysis operations 706 are performed on the end user device 620. As described with examples of FIG. 6, the event analysis operations 706 leverage the machine-learning models of the network computer 610, without the need for the end user device 630 to separately implement machine learning processes. The event analysis operations 706 can, for example, detect and analyze sequences of events on the end user device 620, and the end user device 620 can use the decision logic 630 to (i) make a determination as to whether to generate a trigger 682 based on a predicted user response, and (ii) determine an outcome of the action performed (e.g., whether the user response to the trigger 682 was predicted). In performing the event analysis operations 608, the determination of the end user device 620 can reflect, for example, no action taken on the end user device 620, or action taken on end user device 680. In some examples, the activities can be monitored to determine whether events that followed the determination were predicted, for either determination of action or no action. By way of example, the outcomes may reflect if and when a trigger is generated. When the end user device 620 generates the trigger, the end user device 630 (executing the service application 705) can continue to monitor the user activity to determine whether the user's response to the trigger was as predicted.

In examples, the end user device 620 communicates a set of outcome information 759, which can include, for example, (i) a prediction of the user intent (e.g., a prediction that a user will respond to a trigger in a desired manner), and (ii) a determination as to whether a detected outcome matched the prediction (e.g., whether the user responded as predicted when the trigger was provided to the user). The outcome information 759 can be used to train the models used to generate the decision logic 630. The network computer 610 may subsequently update the decision logic 630 and/or event collection 648, in updates 717, which can be received and implemented by the end user device executing the service application 705.

Figure 8A:
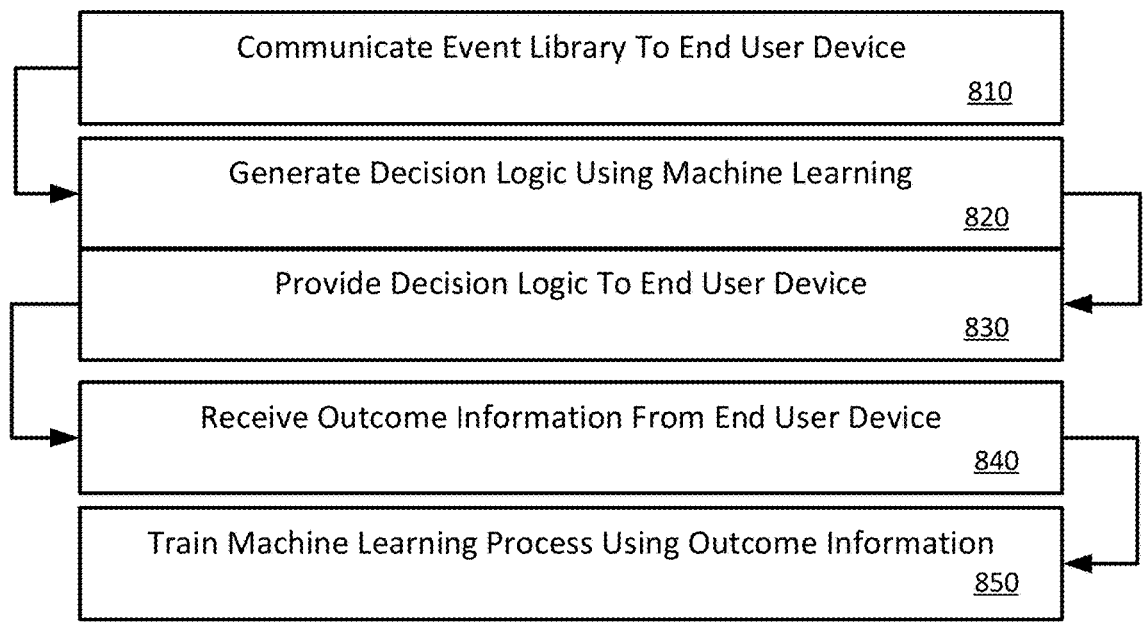
FIG. 8A and FIG. 8B illustrate methods for using a distributed architecture to analyze events detected by an end user device, according to one or more examples.
Figure 8B:
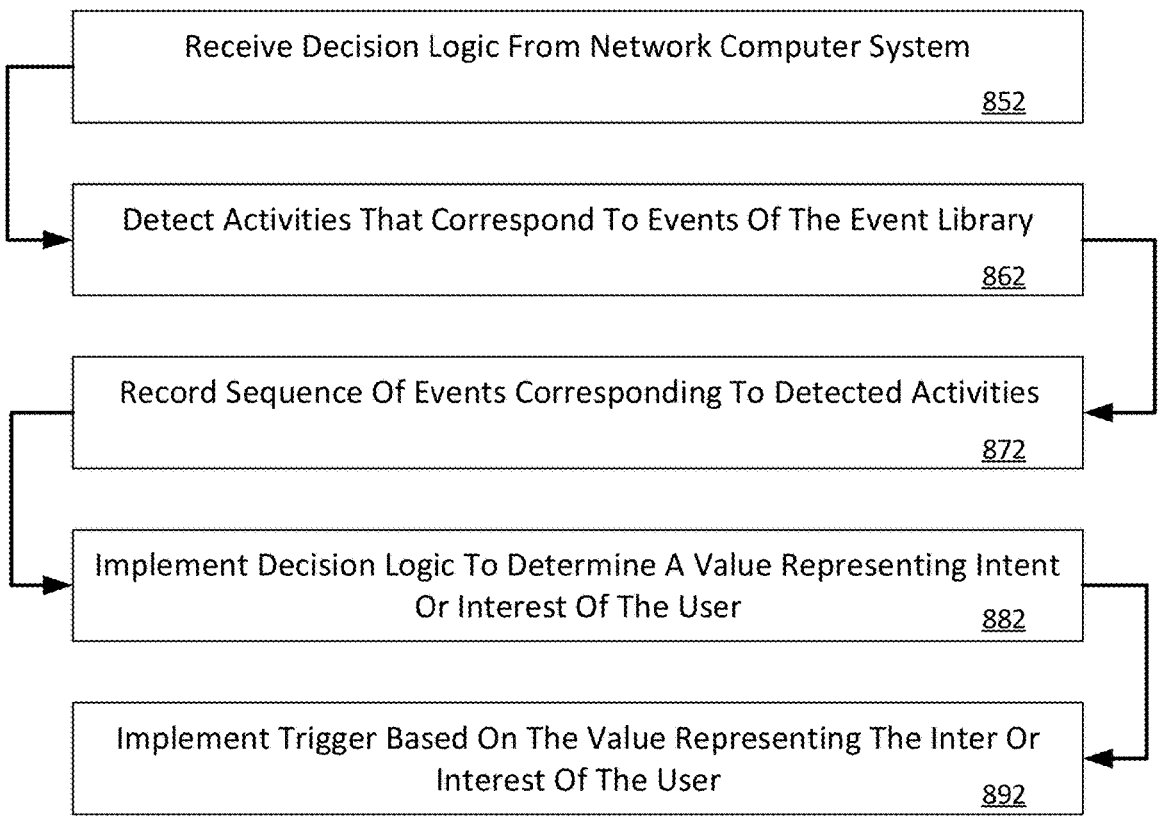

FIG. 8A and FIG. 8B illustrate methods for using a distributed architecture to analyze events detected by an end user device, according to one or more examples. In describing examples of FIG. 8A and FIG. 8B, reference is made to elements of FIG. 6 for purpose of illustrating suitable components or elements for performing a step or sub-step being described.

With reference to FIG. 8A, the network computer 610 communicates a portion of an event library 608 to the end user device 620, where the event library 608 includes data sets that define individual events which the end user device can detect (810). The network computer 610 also generates decision logic 630 using machine learning models or algorithms (820). The decision logic 630 can include, for example, rules and conditions which can be implemented on the end user device 620, in order to enable the end user device 620 to detect predefined events, and to responsively determine an outcome from detected events. As described with other examples, the decision logic 630 can be learned to provide a specific outcome for the end user device 620, based on prior events, event sequences, and/or event patterns. In this manner, the decision logic 630 can cause the end user device 620 to respond to one or multiple events in a manner that is predictive of the user's subsequent response. While the decision logic 630 enables the end user device 620 to operate independently in a predictive manner, the end user device 620 does not utilize the machine-learning models and processes that are used to generate the decision logic 630. For example, the determination component 670 can select (i) the trigger 682 by type and content, (ii) the timing of the trigger 682, and/or (iii) a current or future event which is associated with the trigger 682, with the determinations for the trigger being predicated on a predicted user intent or other outcome. The generated decision logic 630 is then communicated to the end user device (830).

Once the decision logic 630 is communicated to the end user device 620, the network computer 610 processes outcome information 659 from the end user device 620 (840), should any be received. The outcome information can identify whether an outcome that was inherently predicted by the decision logic 630 came to pass, for a particular set or sequence of events. The network computer 610 may then train the machine learning models or algorithms based on the received outcome information (850).

With reference to FIG. 8B, the network computer 610 receives the decision logic 630 from the network computer system (852). As described with other examples, the decision logic 630 can be received and implemented by the service application 705, or other functionality that is provided from or associated with the network computer 610.

The end user device 620 can operate to detect activities of the user, performed using the end user device 620, where the activities correspond to events of the event library (862). Over time, a series of events can be recorded on the end user device 620, using, for example, the event collection data and the service application 705.

The end user device 620 can implement the decision logic 630 to determine the value of a sequence or series of events, where the value is predictive and representative of an intent and/or interest of the user of the end user device (872). The decision logic 630 can be implemented to select a trigger as output for the user, based on the values representing the predicted intent and/or interest of the user (882). The selected trigger may then be implemented on the end user device, such that the selected trigger 682 is provided to the user (892). In some examples, the activities of the end user can are further monitored to determine the outcome information 659.

Figure 9:
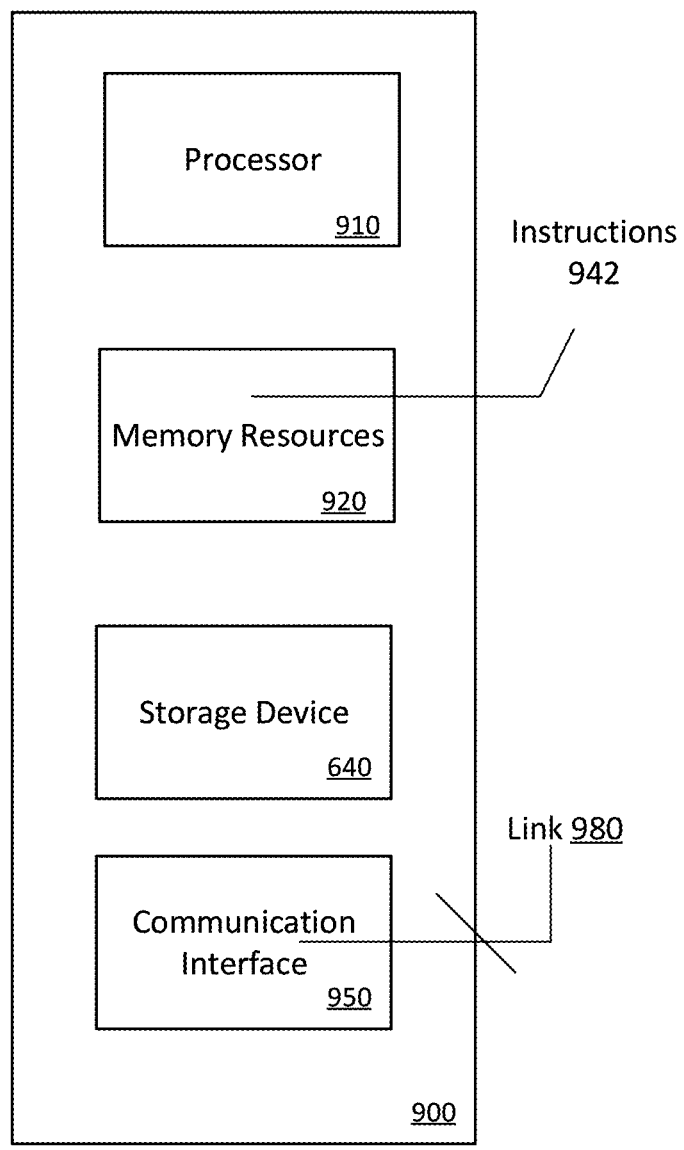
FIG. 9 illustrates a computer system on which one or more embodiments can be implemented.

FIG. 9 illustrates a computer system on which one or more embodiments can be implemented. A computer system 900 can be implemented on, for example, a server or combination of servers. For example, the computer system 900 may be implemented as part of the of an example of FIG. 1A, FIG. 1B and FIG. 6. Likewise, the computer system 900 can implement a method such as described with an example of FIG. 2A, FIG. 2B and FIG. 2C.

In one implementation, the computer system 900 includes processing resources 910, memory resources 920 (e.g., read-only memory (ROM) or random-access memory (RAM)), a storage device 940, and a communication interface 950. The computer system 900 includes at least one processor 910 for processing information stored in the memory resources 920 (e.g., main memory), such as provided by a random-access memory (RAM) or other dynamic storage device, for storing information and instructions which are executable by the processor 910. The memory resources 920 may also be used for storing temporary variables or other intermediate information during execution of instructions to be executed by the processor 910. The computer system 900 may also include the memory resources 920 or other static storage device for storing static information and instructions for the processor 910. The storage device 940, such as a magnetic disk or optical disk, is provided for storing information and instructions.

The communication interface 950 enables the computer system 900 to communicate with one or more networks (e.g., cellular network) through use of the network link 980 (wireless or a wire). Using the network link 980, the computer system 900 can communicate with one or more computing devices, specialized devices and modules, and one or more servers. The executable instructions stored in the memory 930 can include instructions 942, to implement a network computing system such as described with an example of FIG. 1A, FIG. 1B and FIG. 6. The executable instructions stored in the memory resources 920 may also implement a method, such as described with one or more examples of FIG. 2A, FIG. 2B and FIG. 2C.

As such, examples described herein are related to the use of the computer system 900 for implementing the techniques described herein. According to an aspect, techniques are performed by the computer system 900 in response to the processor 910 executing one or more sequences of one or more instructions contained in the memory resources 920.

Such instructions may be read into the memory resources 920 from another machine-readable medium, such as the storage device 940. Execution of the sequences of instructions contained in the memory resources 920 causes the processor 910 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computing system comprising:
   one or more processors;
   a memory storing instructions that, when executed by the one or more processors, cause the computing system to:
   detect real-time activity data from a computing device of an unknown user, the real-time activity data corresponding to a series of activities performed by the unknown user during a current application session using one or more user interface components of a user interface presented on the computing device of the unknown user, wherein the current application session corresponds to the unknown user interacting with an enterprise resource;
   train a machine learning predictive model, based at least in part on other users engaging with the enterprise resource, as to whether an outcome predicted in accordance with a sequence of events came to pass, wherein each event of the sequence of events is associated with a corresponding set of parameters, and wherein the one or more processors access the instructions to determine a value for at least one parameter of the corresponding set of parameters for the associated event;
   wherein the corresponding set of parameters for at least a first event of the sequence of events includes a set of related activity parameters, the set of related activity parameters including a first related activity parameter that identifies information about one or more activities of a particular type that preceded or followed the first event;
   execute the machine learning predictive model to determine a user intent probability that the unknown user will engage with selected content during the current application session; and
   based on the user intent probability, (i) determine whether the unknown user is indecisive towards performing an action to engage with the selected content on the computing device of the unknown user during the current session; and (ii) implement a trigger for causing the user to perform the action during the current session.

2. The computing system of claim 1, wherein the real-time activity data corresponds to a number of page views in the current application session.

3. The computing system of claim 1, wherein the real-time activity data indicates interest in a product, and the trigger comprises at least one of a particular type of communication and a type of promotion.

4. The computing system of claim 3, wherein the selected content corresponds to a user interface element that enables the unknown user to purchase the product.

5. The computing system of claim 1, wherein the enterprise resource comprises an e-commerce resource.

6. A non-transitory computer readable medium storing instructions that, when executed by one or more processors of a computing system, cause the computing system to:
   detect real-time activity data from a computing device of an unknown user, the real-time activity data corresponding to a series of activities performed by the unknown user during a current application session using one or more user interface components of a user interface presented on the computing device of the unknown user, wherein the current application session corresponds to the unknown user interacting with an enterprise resource;
   train a machine learning predictive model, based at least in part on other users engaging with the enterprise resource, as to whether an outcome predicted in accordance with a sequence of events came to pass, wherein each event of the sequence of events is associated with a corresponding set of parameters, and wherein the one or more processors determine a value for at least one parameter of the corresponding set of parameters for the associated event;
   wherein the corresponding set of parameters for at least a first event of the sequence of events includes a set of related activity parameters, the set of related activity parameters including a first related activity parameter that identifies information about one or more activities of a particular type that preceded or followed the first event;
   execute the machine learning predictive model to determine a user intent probability that the unknown user will engage with selected content during the current application session; and
   based on the user intent probability, (i) determine whether the unknown user is indecisive towards performing an action to engage with the selected content on the computing device of the unknown user during the current session; and (ii) implement a trigger for causing the user to perform the action during the current session.

7. The non-transitory computer readable medium of claim 6, wherein the real-time activity data corresponds to a number of page views in the current application session.

8. The non-transitory computer readable medium of claim 6, wherein the real-time activity data indicates interest in a product, and the trigger comprises at least one of a particular type of communication and a type of promotion.

9. The non-transitory computer readable medium of claim 8, wherein the selected content corresponds to a user interface element that enables the unknown user to purchase the product.

10. The non-transitory computer readable medium of claim 6, wherein the enterprise resource comprises an e-commerce resource.

11. A computer-implemented method of reducing network latency, the method being performed by one or more processors and comprising:
- detecting real-time activity data from a computing device of a unknown user, the real-time activity data corresponding to a series of activities performed by the unknown user during a current application session using one or more user interface components of a user interface presented on the computing device of the unknown user, wherein the current application session corresponds to the unknown user interacting with an enterprise resource;
- training a machine learning predictive model, based at least in part on other users engaging with the enterprise resource, as to whether an outcome predicted in accordance with a sequence of events came to pass, wherein each event of the sequence of events is associated with a corresponding set of parameters, and wherein the one or more processors determine a value for at least one parameter of the corresponding set of parameters for the associated event;
- wherein the corresponding set of parameters for at least a first event of the sequence of events includes a set of related activity parameters, the set of related activity parameters including a first related activity parameter that identifies information about one or more activities of a particular type that preceded or followed the first event;
- executing the machine learning predictive model to determine a user intent probability that the unknown user will engage with selected content during the current application session; and
- based on the user intent probability, (i) determine whether the unknown user is indecisive towards performing an action to engage with the selected content on the computing device of the unknown user during the current session; and (ii) implement a trigger for causing the user to perform the action during the current session.

12. The method of claim 11, wherein the real-time activity data corresponds to a number of page views in the current application session.

13. The method of claim 12, wherein the real-time activity data indicates interest in a product, and the trigger comprises at least one of a particular type of communication and a type of promotion.

14. The method of claim 13, wherein the selected content corresponds to a user interface element that enables the unknown user to purchase the product.

\* \* \* \* \*